United States Patent
Brinkmann et al.

(10) Patent No.: US 10,208,685 B2
(45) Date of Patent: *Feb. 19, 2019

(54) METHOD FOR CHARGE PRESSURE CONTROL OF AN INTERNAL COMBUSTION ENGINE WITH TURBINES ARRANGED IN PARALLEL, AND INTERNAL COMBUSTION ENGINE FOR CARRYING OUT SUCH A METHOD

(71) Applicant: Ford Global Technologies, LLC, Dearborn, MI (US)

(72) Inventors: Franz J. Brinkmann, Huerth-Efferen (DE); Vanco Smiljanovski, Bedburg (DE); Joerg Kemmerling, Monschau (DE); Jens Wojahn, Bergisch Gladbach (DE); Harald Stoffels, Cologne (DE)

(73) Assignee: Ford Global Technologies, LLC, Dearborn, MI (US)

( * ) Notice: Subject to any disclaimer, the term of this patent is extended or adjusted under 35 U.S.C. 154(b) by 204 days.

This patent is subject to a terminal disclaimer.

(21) Appl. No.: 15/183,505

(22) Filed: Jun. 15, 2016

(65) Prior Publication Data

US 2016/0369717 A1    Dec. 22, 2016

(30) Foreign Application Priority Data

Jun. 22, 2015   (DE) .................... 10 2015 211 437
Jul. 15, 2015   (DE) .................... 10 2015 213 231

(51) Int. Cl.
*F02D 41/00*   (2006.01)
*F02D 13/02*   (2006.01)
(Continued)

(52) U.S. Cl.
CPC ........ *F02D 41/0007* (2013.01); *F02B 37/007* (2013.01); *F02B 37/10* (2013.01);
(Continued)

(58) Field of Classification Search
CPC ... F02B 2037/122; F02B 37/007; F02B 37/12
See application file for complete search history.

(56) References Cited

U.S. PATENT DOCUMENTS

| | | | |
|---|---|---|---|
| 5,081,842 A | 1/1992 | Sugiyama et al. |
| 5,197,287 A | 3/1993 | Okimoto et al. |

(Continued)

FOREIGN PATENT DOCUMENTS

| | | |
|---|---|---|
| DE | 10022113 A1 | 11/2001 |
| DE | 602005000777 T2 | 1/2008 |

(Continued)

*Primary Examiner* — Mary A Davis
(74) *Attorney, Agent, or Firm* — Julia Voutyras; McCoy Russell LLP

(57) ABSTRACT

Embodiments for controlling boost pressure during transient conditions are disclosed. In one example, a method includes, responsive to deactivation of a first turbine of a first turbocharger, deactivating an exhaust valve of a cylinder to flow exhaust gas from the cylinder to a second turbine of a second turbocharger, and adjusting a speed of the second turbocharger via an electric machine coupled to the second turbocharger in a generator mode; and responsive to activation of the first turbine, activating the exhaust valve to flow exhaust gas from the cylinder to the first turbine and the second turbine, and adjusting the speed of the second turbocharger via the electric machine in an auxiliary drive mode.

19 Claims, 4 Drawing Sheets

(51) Int. Cl.
    *F02M 26/08* (2016.01)
    *F02B 39/10* (2006.01)
    *F02B 37/007* (2006.01)
    *F02B 37/10* (2006.01)
    *F02B 37/12* (2006.01)
    *F02D 23/00* (2006.01)

(52) U.S. Cl.
    CPC .............. *F02B 37/12* (2013.01); *F02B 39/10* (2013.01); *F02D 13/0242* (2013.01); *F02D 13/0257* (2013.01); *F02D 23/00* (2013.01); *F02M 26/08* (2016.02); *F02B 2037/122* (2013.01); *F02D 2200/10* (2013.01); *Y02T 10/144* (2013.01); *Y02T 10/18* (2013.01)

(56) References Cited

U.S. PATENT DOCUMENTS

| | | | |
|---|---|---|---|
| 6,055,812 A | 5/2000 | Trumbower | |
| 7,509,805 B2 * | 3/2009 | Karlsson | F02B 37/007 123/562 |
| 9,874,161 B2 * | 1/2018 | Sommerhoff | F02B 37/007 |
| 9,896,991 B2 * | 2/2018 | Smiljanovski | F02B 37/007 |
| 9,915,193 B2 * | 3/2018 | Casal Kulzer | F02B 37/001 |
| 2002/0124565 A1 | 9/2002 | Tsuji | |
| 2012/0240572 A1 * | 9/2012 | Schorn | F02B 37/007 60/602 |
| 2012/0285164 A1 * | 11/2012 | Kuhlbach | F02B 37/007 60/602 |

FOREIGN PATENT DOCUMENTS

| | | |
|---|---|---|
| DE | 102007046657 A1 | 4/2009 |
| DE | 102009013040 A1 | 9/2010 |
| DE | 102009060339 A1 | 6/2011 |
| DE | 202014101572 U1 | 4/2014 |
| EP | 1400667 A2 | 3/2004 |
| JP | 05156960 A * | 6/1993 ............ F02B 37/007 |

* cited by examiner

METHOD FOR CHARGE PRESSURE CONTROL OF AN INTERNAL COMBUSTION ENGINE WITH TURBINES ARRANGED IN PARALLEL, AND INTERNAL COMBUSTION ENGINE FOR CARRYING OUT SUCH A METHOD

CROSS REFERENCE TO RELATED APPLICATIONS

This application claims priority to German Patent Application No. 102015211437.6, filed Jun. 22, 2015, and to German Patent Application No. 102015213231.5, filed Jul. 15, 2015, the entire contents of each of which are hereby incorporated by reference for all purposes.

FIELD

The disclosure relates to a method for charge pressure control of a supercharged internal combustion engine.

BACKGROUND/SUMMARY

Internal combustion engines have a cylinder block and at least one cylinder head which are connected to one another to form the cylinders. To control the charge exchange, an internal combustion engine requires control elements—generally in the form of lifting valves—and actuating devices for actuating these control elements. Each lifting valve moves, so as to realize, that is to say perform, a valve lift, between an open position and a closed position, and in so doing, during an opening duration, opens up the opening associated with the valve. The valve actuating mechanism required for the movement of a valve, including the valve itself, is referred to as the valve drive. The cylinder head often serves to accommodate the valve drive.

During the charge exchange, the combustion gases are discharged via the outlet openings of the cylinders and the charging of the combustion chambers with charge air takes place via the inlet openings. It is the object of the valve drive to open and close the inlet and outlet openings at the correct times, with a fast opening of the largest possible flow cross sections generally being sought in order to keep the throttling losses in the inflowing and outflowing gas flows low and in order to ensure the best possible charging of the cylinders and an effective discharge of the exhaust gases. According to the prior art, therefore, the cylinders are also often provided with two or more inlet and outlet openings.

According to the prior art, the inlet ducts which lead to the inlet openings, and the exhaust lines which adjoin the outlet openings, are at least partially integrated in the cylinder head. The exhaust lines of the cylinders are generally merged to form one common overall exhaust line, or else in groups to form two or more overall exhaust lines. The merging of exhaust lines to form an overall exhaust line is referred to generally as an exhaust manifold.

Downstream of the manifolds, the exhaust gases may be supplied, for the purpose of supercharging the internal combustion engine, to the turbines of at least two exhaust-gas turbochargers, and if appropriate to one or more exhaust-gas aftertreatment systems.

The advantage of an exhaust-gas turbocharger for example in relation to a mechanical charger is that no mechanical connection for transmitting power exists or is required between the charger and internal combustion engine. While a mechanical charger extracts the energy required for driving it entirely from the internal combustion engine, and thereby reduces the output power and consequently adversely affects the efficiency, the exhaust-gas turbocharger utilizes the exhaust-gas energy of the hot exhaust gases.

An exhaust-gas turbocharger comprises a compressor and a turbine which are arranged on the same shaft. The hot exhaust-gas flow is fed to the turbine and expands in the turbine with a release of energy, as a result of which the shaft is set in rotation. The energy supplied by the exhaust-gas flow to the turbine and ultimately to the shaft is used for driving the compressor which is likewise arranged on the shaft. The compressor delivers and compresses the charge air supplied to it, as a result of which supercharging of the at least two cylinders is obtained. A charge-air cooling arrangement may be provided, by means of which the compressed charge air is cooled before it enters the cylinders.

Supercharging serves primarily to increase the power of the internal combustion engine. Here, the air required for the combustion process is compressed, as a result of which a greater air mass can be supplied to each cylinder per working cycle. In this way, the fuel mass and therefore the mean pressure can be increased. Supercharging is a suitable means for increasing the power of an internal combustion engine while maintaining an unchanged swept volume, or for reducing the swept volume while maintaining the same power. In any case, supercharging leads to an increase in volumetric power output and an improved power-to-weight ratio. If the swept volume is reduced, it is thus possible, given the same vehicle boundary conditions, to shift the load collective toward higher loads, at which the specific fuel consumption is lower.

It is basically sought to arrange the turbine of an exhaust-gas turbocharger as close as possible to the outlet openings of the cylinders in order thereby to be able to make optimum use of the exhaust-gas enthalpy of the hot exhaust gases, which is determined significantly by the exhaust-gas pressure and the exhaust-gas temperature, and to ensure a fast response behavior of the turbine and thus of the turbocharger. In this connection, it is also sought to minimize the thermal inertia and the volume of the line system between the outlet openings of the cylinders and of the turbine, which may be achieved by reducing the mass and the length of the exhaust lines. Here, the integration of the exhaust manifolds into the cylinder head is expedient in achieving this aim.

The configuration of the exhaust-gas turbocharging often poses difficulties, wherein it is basically sought to obtain a noticeable performance increase in all rotational speed ranges. According to the prior art, however, a torque drop is observed in the event of a certain engine speed being undershot. Said torque drop is understandable if one takes into consideration that the charge pressure ratio is dependent on the turbine pressure ratio. For example, if the engine speed is reduced, this leads to a smaller exhaust-gas mass flow and therefore to a lower turbine pressure ratio. This has the result that, toward lower engine speeds, the charge pressure ratio and the charge pressure likewise decrease, which equates to a torque drop.

According to the prior art, it has been sought to improve the torque characteristic of a supercharged internal combustion engine by various measures, for example by means of a small design of the turbine cross section and simultaneous exhaust-gas blow-off. Such a turbine is also referred to as a wastegate turbine. If the exhaust-gas flow rate exceeds a critical value, a part of the exhaust-gas flow is, within the course of the so-called exhaust-gas blow-off, conducted via a bypass line past the turbine. Said approach has the disadvantage that the supercharging behavior is inadequate at relatively high engine speeds or in the case of relatively large exhaust-gas flow rates.

The torque characteristic may also be advantageously influenced by means of multiple exhaust-gas turbochargers connected in series. By connecting two exhaust-gas turbochargers in series, of which one exhaust-gas turbocharger serves as a high-pressure stage and one exhaust-gas turbocharger serves as a low-pressure stage, the compressor characteristic map can advantageously be expanded, specifically both in the direction of smaller compressor flows and also in the direction of larger compressor flows.

In particular, with the exhaust-gas turbocharger which serves as a high-pressure stage, it is possible for the surge limit to be shifted in the direction of smaller compressor flows, as a result of which high charge pressure ratios can be obtained even with small compressor flows, which considerably improves the torque characteristic in the lower engine speed range. This is achieved by designing the high-pressure turbine for small exhaust-gas mass flows and by providing a bypass line by means of which, with increasing exhaust-gas mass flow, an increasing amount of exhaust gas is conducted past the high-pressure turbine. For this purpose, the bypass line branches off from the exhaust-gas discharge system upstream of the high-pressure turbine and opens into the exhaust-gas discharge system again upstream of the low-pressure turbine, wherein a shut-off element is arranged in the bypass line in order to control the exhaust-gas flow conducted past the high-pressure turbine. The response behavior of an internal combustion engine supercharged in this way is considerably improved in relation to a similar internal combustion engine with single-stage supercharging, because the relatively small high-pressure stage is less inert, that is to say the rotor of a smaller-dimensioned exhaust-gas turbocharger can be accelerated more rapidly.

The torque characteristic of a supercharged internal combustion engine may furthermore be improved by means of multiple turbochargers arranged in parallel, that is to say by means of multiple turbines of relatively small turbine cross section arranged in parallel, wherein individual turbines are activated successively with increasing exhaust-gas flow rate. At least one turbine may be in the form of an activatable turbine which is acted on with exhaust gas, that is to say activated, only in the presence of relatively high exhaust-gas flow rates.

To further improve the torque characteristic, each cylinder of the internal combustion engine may be equipped with at least one activatable outlet opening. The exhaust lines of at least two cylinders are then merged in grouped fashion such that the exhaust lines of the activatable outlet openings and the exhaust lines of the other outlet openings are merged, in each case with the formation of an exhaust manifold, to form an overall exhaust line.

The exhaust lines of the activatable outlet openings lead to the turbine of the first exhaust-gas turbocharger, and the exhaust lines of the other outlet openings lead to the turbine of the second exhaust-gas turbocharger. The first turbine, which is assigned to the activatable outlet openings, is thus in the form of an activatable turbine. According to the prior art, the activatable outlet openings are opened during the course of the charge exchange, and the activated first turbine is thus acted on with exhaust gas, only in the presence of relatively large exhaust-gas flow rates.

In comparison with concepts in which a single coherent exhaust line system is provided upstream of the two turbines, the above-described grouping, that is to say the use of two mutually separate exhaust manifolds, noticeably improves the operating behavior of the internal combustion engine, in particular at low exhaust-gas flow rates, inter alia because the line volume upstream of the second turbine, through which exhaust gas flows continuously, is reduced in size by this measure, which is advantageous, and in particular improves the response behavior, at low loads and engine speeds, that is to say in the presence of low exhaust-gas flow rates.

There are however also resulting disadvantages. The rotational speed of the activatable turbine decreases drastically when the latter is deactivated, such that, upon reactivation, the rotor of said turbine must initially be accelerated in order to be able to generate and provide the desired charge pressure at the compressor side. The response behavior is consequently impaired.

To ensure a minimum rotational speed of the activatable turbine, the activatable turbine could be supplied with a small exhaust-gas flow even when its outlet openings are deactivated. For this purpose, it would be necessary for a corresponding line to connect the second exhaust manifold to the first turbine, possibly with the use of at least one additional shut-off element, though this would disadvantageously increase the complexity and space requirement of the exhaust line system upstream of the turbines. Furthermore, the line would create a connection between the two exhaust manifolds, and the grouping described above would be eliminated. The effects obtained through the use of two mutually separate exhaust manifolds would be at least lessened.

A further disadvantage of the use of an activatable turbine of the type described above, in which activatable outlet openings are used as switching means, consists in that, upon the activation of the outlet openings for the purposes of activating the turbine, the exhaust-gas flow conducted through the second turbine abruptly decreases, as in each cylinder there is now a further outlet opening, specifically the activated outlet opening, available for the exhaust gas during the charge exchange. Upon the activation of the first turbine, the charge pressure generated by the second compressor then abruptly decreases. The torque drop associated with the drop in charge pressure is undesirable. In this respect, measures are desirable for improving the transient behavior of the exhaust-gas turbocharging arrangement upon the activation of the first turbine.

The inventors herein have recognized the above issues and provide an approach to at least partly address them. In one example, a method includes responsive to deactivation of a first turbine of a first turbocharger, deactivating an exhaust valve of a cylinder to flow exhaust gas from the cylinder to a second turbine of a second turbocharger, and adjusting a speed of the second turbocharger via an electric machine coupled to the second turbocharger in a generator mode. The method also includes, responsive to activation of the first turbine, activating the exhaust valve to flow exhaust gas from the cylinder to the first turbine and the second turbine, and adjusting the speed of the second turbocharger via the electric machine in an auxiliary drive mode.

In this way, the electric machine may be activated in either a generator mode or an auxiliary drive mode to absorb rotational energy of the second turbocharger or to supply rotational energy to the second turbocharger, when the first turbine is in the process of being deactivated or activated. By doing so, the exhaust-gas turbocharging arrangement and torque characteristic of the internal combustion engine, in particular the transient behavior, can be improved further.

In another example, boost fluctuations that may occur during activation or deactivation of the first turbine may be controlled by adjusting a wastegate of the second turbine and adjusting the cylinder charge amount via adjustment of valve timing, lift, and/or duration of the non-deactivated cylinder valves. An example method provided herein includes, responsive to a command to activate a deactivated first turbine, closing a wastegate coupled across a second turbine and adjusting a parameter of a first cylinder valve. The method further includes activating the first turbine by activating a second cylinder valve. In one example, the first cylinder valve may be a partially variable exhaust valve controlling a first opening of the cylinder fluidically coupled to the second turbine (and not the first turbine), and the second cylinder valve may be a deactivatable exhaust valve controlling a second opening of the cylinder fluidically coupled to the first turbine (and not the second turbine). In another example, the first cylinder valve may be an intake valve. In one example, adjusting the parameter of the first cylinder valve may include adjusting the timing, lift, and/or duration of a valve event of the first cylinder valve to reduce a volume of charge air admitted to the cylinder.

In this way, before the activation of the deactivated outlet openings, preparatory measures are performed in order to make it possible for a torque drop upon the activation of the first turbine to be counteracted in an effective manner, preferably without a delay.

Accordingly, the exhaust-gas flow rate conducted past the second turbine is reduced by virtue of the wastegate (also referred to as the second shut-off element) or the second bypass line being at least partially closed, wherein the additional power thereby generated at the second turbine, which is available as additional compressor power, increases, or would increase, the charge pressure at the inlet side. Specifically, an increased charge pressure is compensated according to the disclosure in that the cylinder fresh charge, that is to say the charge air mass remaining in the cylinders after the charge exchange, is set and metered, and in particular can be kept constant. The latter is performed using further at least partially variable valve drives, which are provided at the inlet side and/or at the outlet side.

An increased or higher charge pressure may be compensated for example by way of a reduction of the volumetric air usage. Specifically, the charge air mass supplied to a cylinder is dependent both on the charge pressure and on the supplied volume. That is to say, an increased or higher charge pressure can be compensated by reducing the volumetric efficiency $\lambda_l$, wherein the following applies:

$$\lambda_l = m_z/M_{th} = V_z \cdot \rho_z/V_{th} \cdot \rho_{th} = V_z/V_{th}$$

The mass of the supplied cylinder fresh charge is denoted by $m_z$ and the theoretically suppliable cylinder fresh charge is denoted by $m_{th}$, wherein, for the theoretical charge density $\rho_{th}$ and the charge density $\rho_z$ in the cylinder, the following approximately applies: $\rho_{th} = \rho_z$. The density $\rho$ is determined in each case by the charge pressure. The theoretical air usage $V_{th}$ is made up of the swept volume and the compression volume together.

If the demanded torque is to be kept unchanged, that is to say maintained, during the execution of the preparatory measures, it is necessary for the mass of the cylinder fresh charge to be maintained. In the presence of relatively high charge pressure, it is necessary for the at least partially variable valve drives to then be adjusted such that the volumetric air usage $V_z$, that is to say the volumetric cylinder fresh charge, to be reduced. Here, the second compressor is operated at a significantly higher rotational speed than would actually be required, and therefore has a present rotational speed reserve.

If the deactivated outlet openings are now activated for the purposes of activating the first turbine, the exhaust-gas flow rate discharged from the cylinders via the activated outlet openings, that is to say the exhaust-gas flow that is now absent at the second turbine, is compensated by setting the cylinder fresh charge by way of adjustment of the further at least partially variable valve drives, specifically to such an extent that the demanded torque is provided, or the presently prevailing torque is maintained.

The exhaust-gas flow conducted through the second turbine duly decreases when the first turbine is activated. According to the disclosure, however, the torque drop observed in the prior art as a result of a charge pressure loss is eliminated.

A torque drop upon the activation of the first turbine can be counteracted virtually without delay, because according to the disclosure, at the inlet side, that is to say at the side of the intake system, the cylinder fresh charge is influenced specifically using at least partially variable valve drives or by variation of the timing and/or of the valve lift of said valve drives.

This approach permits charge pressure control with very fast response. In relation to methods in which it is sought for the charge pressure to be increased or raised on the exhaust-gas side by adjustment of the second shut-off element, that is to say by closing the second bypass line, the method according to the disclosure for controlling the charge pressure has proven to be significantly faster.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
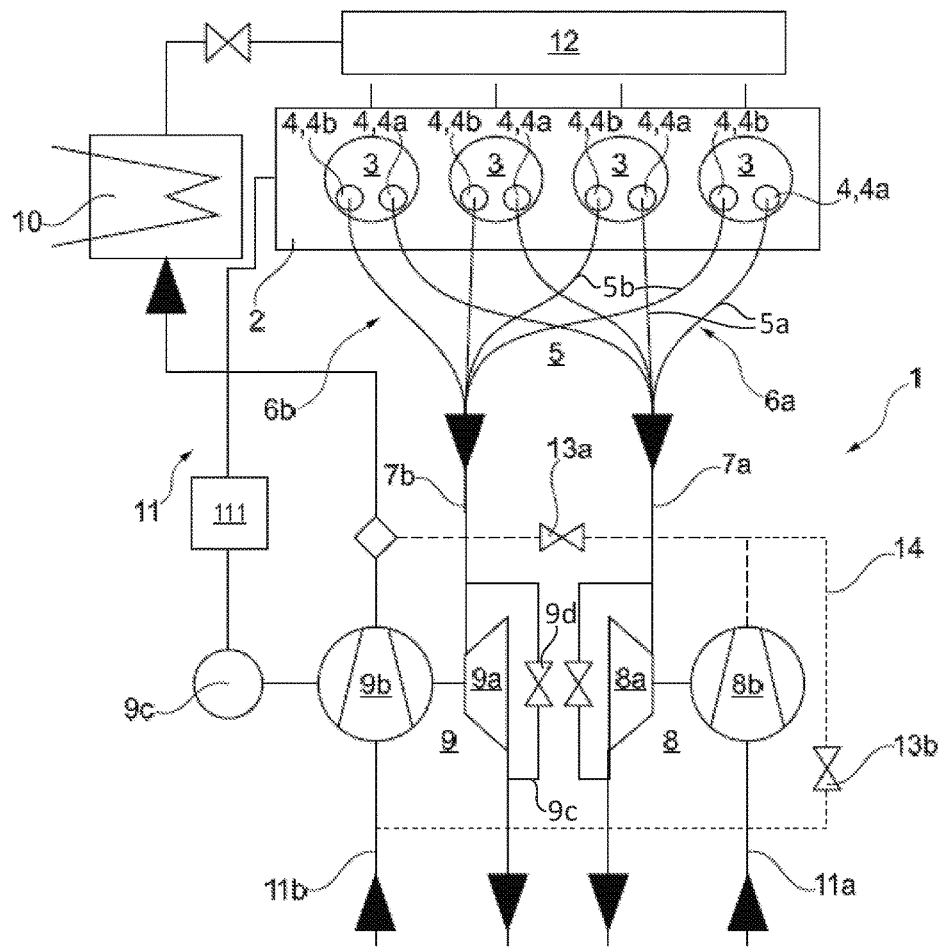
FIG. 1 schematically shows an embodiment of an internal combustion engine.
Figure 1:
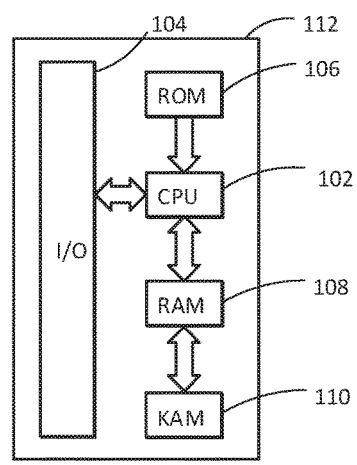

Within the context of the present disclosure, the expression "internal combustion engine" in particular encompasses Otto-cycle engines but also diesel engines and hybrid internal combustion engines, which utilize a hybrid combustion process, and also hybrid drives which comprise not only the internal combustion engine but also an electric machine which can be connected in terms of drive to the internal combustion engine and which receives power from the internal combustion engine or which, as an activatable auxiliary drive, additionally outputs power.

A typical multi-turbocharger concept for combustion engines is a parallel sequential layout including a primary turbocharger and a second turbocharger. This concept is capable meeting boosting demands over a very large speed/load range by switching the secondary turbocharger on and off. This can be usually realized with a shut-off valve at the turbine inlet that can interrupt the exhaust gas flow to the turbine so that the turbocharger comes to a complete standstill. This hot gas valve is prone to durability and controllability issues, and thus it may be desirable to instead use switchable exhaust valve tappets and separate exhaust manifolds to switch on or off the secondary turbocharger by the engine exhaust valve tappets.

When switching on or off the secondary turbocharger, the exhaust gas flow available for the primary turbocharger fluctuates significantly, so that a very fast control strategy is required to compensate possible boost pressure and torque deviations. One method is to control the exhaust gas flow excursions by opening/closing the waste gate of the primary turbocharger. But usually this device is too slow to level the torque output satisfactorily.

Thus, according to embodiments disclosed herein, a parallel sequential turbocharging system includes a first (secondary) turbocharger and a second (primary) turbocharger. Exhaust flow through the first turbocharger may be regulated via switchable exhaust valves, such that the exhaust volumetric flow is shared between both the first turbine of the first turbocharger and the second turbine of the second turbocharger, or lead to the second turbine only, for example by using the switchable exhaust valves. Each cylinder of the engine includes two or more exhaust valves, so that each second exhaust valve of each cylinder can be deactivated to cut off the second turbocharger from exhaust gas flow.

To enable a fast and adjustable control of the total air flow to the engine during switching on or off the first turbocharger, an Electrically-Assisted Turbocharger (EA-TC) may be used as a primary device. For example, if the first turbocharger is switched on, the speed drop of the second turbocharger due to decrease of exhaust mass flow can be compensated by the electric device of the EA-TC, so that turbocharger speed and hence the boost pressure can be kept constant until the first turbocharger has achieved the speed to deliver the appropriate boost pressure.

In addition, the electric motor of the EA-TC could be used as a regenerative brake for the second turbocharger to avoid over-speeding and therefore too high boost pressure peaks, when first turbocharger is to be switched off.

If a sophisticated boost control model is applied, the required electrical assistance of the second turbocharger could be determined in advance, enabling a fast forward control during the switching process. This could include the dedicated speed information that electrically-assisted turbochargers typically provide.

In the method according to the disclosure, upon the activation of the deactivated switchable outlet openings, an electric machine which is connected in terms of drive to the second exhaust-gas turbocharger is used to make it possible for a torque drop upon the activation of the first turbine to be counteracted in an effective manner, preferably without a delay. As used herein "switchable outlet openings" refers to the openings (e.g., ports) in the cylinders that are controlled by deactivatable (e.g., switchable) exhaust valves.

If the deactivated outlet openings are activated for the purposes of activating the first turbine, the exhaust-gas flow rate discharged from the cylinders via the activated outlet openings, that is to say the exhaust-gas flow that is now absent from the second turbine, is compensated using the electric machine as an auxiliary drive. The electric machine then additionally provides power for driving the second compressor, such that a demanded charge pressure can be provided, or the prevailing charge pressure can be maintained.

The power deficit in the drive of the second compressor, which deficit arises from the fact that the exhaust-gas flow conducted through the second turbine decreases upon the activation of the first turbine, is made up by way of the electric machine which serves, or is used, as an auxiliary drive. That is to say, the electric machine compensates the decrease of the exhaust-gas flow conducted through the second turbine, and thus the decrease of the turbine power.

The exhaust-gas flow conducted through the second turbine duly decreases when the first turbine is activated. According to the disclosure, however, the torque drop observed in the prior art as a result of a charge pressure loss is eliminated.

A torque drop upon the activation of the first turbine can be counteracted virtually without delay, because according to the disclosure, at the inlet side, that is to say at the side of the intake system, the charge pressure is influenced, specifically using the electric machine.

This approach permits charge pressure control with very fast response. In relation to methods in which the charge pressure is set on the exhaust-gas side by adjustment of a wastegate of the second turbine, the method according to the disclosure for controlling the charge pressure has proven to be significantly faster.

That which has been stated above with regard to the activation of the deactivated outlet openings or the activation of the first turbine applies analogously also to the deactivation of the activated outlet openings or deactivation of the first turbine, wherein the electric machine is then used as a generator in order to absorb power from the turbine of the second exhaust-gas turbocharger and thereby lower the charge pressure, that is to say prevent charge pressure peaks. In doing so, the exhaust-gas turbocharging arrangement and torque characteristic of the internal combustion engine, in particular the transient behavior, can be improved further.

The internal combustion engine according to the disclosure may have at least one exhaust-gas recirculation arrangement which comprises a recirculation line which branches off from the exhaust-gas discharge system and opens into the intake system. Exhaust-gas recirculation, that is to say the recirculation of combustion gases, is a suitable means for reducing the nitrogen oxide emissions, wherein it is possible for the nitrogen oxide emissions to be considerably reduced with increasing exhaust-gas recirculation rate. Here, the exhaust-gas recirculation rate $x_{EGR}$ is determined as $x_{EGR}=m_{EGR}/(m_{EGR}+m_{fresh\ air})$, where $m_{EGR}$ denotes the mass of recirculated exhaust gas and $m_{fresh\ air}$ denotes the supplied fresh air which, if appropriate, is conducted through a compressor and compressed. To obtain a considerable reduction in nitrogen oxide emissions, high exhaust-gas recirculation rates are indicated which may be of the order of magnitude of $x_{EGR} \approx 60\%$ to $70\%$.

Embodiments of the supercharged internal combustion engine are provided in which a valve for adjusting the recirculated exhaust-gas flow rate is arranged in the recirculation line of the at least one exhaust-gas recirculation arrangement. Embodiments of the supercharged internal combustion engine are provided in which the recirculation line branches off from the exhaust-gas discharge system downstream of the turbine of the second exhaust-gas turbocharger and opens into the intake system, preferably downstream of the compressor of the second exhaust-gas turbocharger. In the case of said so-called high-pressure EGR, the exhaust gas is extracted from the exhaust-gas discharge system upstream of a turbine and is fed into the intake system downstream of a compressor, whereby the exhaust gas need not be subjected to exhaust-gas aftertreatment, in particular supplied to a particle filter, before being recirculated, because there is no risk of fouling of the compressor.

In the case of the operation of an internal combustion engine with exhaust-gas turbocharging and the simultaneous use of high-pressure EGR, a conflict may however arise because the recirculated exhaust gas is no longer available for driving the turbine. In the event of an increase in the exhaust-gas recirculation rate, the exhaust-gas flow introduced into the turbine decreases, possibly in an abrupt manner. The reduced exhaust-gas mass flow through the turbine leads to a lower turbine pressure ratio, as a result of which the charge pressure ratio also falls, which equates to a lower charge pressure and a smaller charge-air flow.

The power deficit in the drive of the second compressor, which deficit arises from the fact that the exhaust-gas flow conducted through the second turbine decreases as a result of exhaust-gas recirculation, can be compensated according to the disclosure by way of the auxiliary drive.

Another solution, or an additional solution, is offered by so-called low-pressure EGR. By contrast to high-pressure EGR, in the case of low-pressure EGR, exhaust gas which has already flowed through the turbine is introduced into the intake system. For this purpose, the low-pressure EGR arrangement has a recirculation line which branches off from the exhaust-gas discharge system downstream of the second turbine and issues into the intake system preferably upstream of the second compressor.

The exhaust gas which is recirculated via the low-pressure EGR arrangement to the inlet side is mixed with fresh air. The mixture of fresh air and recirculated exhaust gas produced in this way forms the charge air which is supplied to the second compressor and compressed.

Since, within the low-pressure EGR arrangement, exhaust gas is commonly conducted through the compressor, said exhaust gas may be previously subjected to exhaust-gas aftertreatment, in particular in a particle filter. Depositions in the compressor which change the geometry of the compressor, in particular the flow cross sections, and thereby impair the efficiency of the compressor, may be prevented.

For the reasons stated above, embodiments of the supercharged internal combustion engine are likewise provided in which the recirculation line of the at least one exhaust-gas recirculation arrangement branches off from the exhaust-gas discharge system downstream of the second turbine and opens into the intake system upstream of the associated second compressor.

An internal combustion engine according to the disclosure may also have two cylinder heads. It is also possible for three exhaust-gas turbochargers to be provided. In the prior art, three-cylinder in-line engines are seldomly equipped with two turbines arranged in parallel. The merging of the exhaust lines in accordance with the disclosure however permits this without problems even though three-cylinder in-line engines are, out of principle, only poorly suited to grouping, in particular cylinder grouping. Therefore, embodiments are also provided in which the internal combustion engine for carrying out the method according to the disclosure has a cylinder head with three cylinders.

Embodiments of the method are provided in which, proceeding from deactivated outlet openings, the deactivated outlet openings are activated for the purposes of activating the first turbine, a decreasing exhaust-gas flow rate conducted through the second turbine being compensated by virtue of the electric machine being used as auxiliary drive in order to additionally output power to the compressor of the second exhaust-gas turbocharger, such that a demanded charge pressure is provided.

Embodiments of the method are also provided in which, proceeding from deactivated outlet openings, the first turbine is activated, with the charge pressure being maintained, by virtue of the electric machine, as an auxiliary drive, outputting such an amount of power to the compressor of the second exhaust-gas turbocharger that the charge pressure is maintained.

In the context of the method according to the disclosure, what is generally referred to is the provision of a demanded charge pressure, which also encompasses dynamic processes, that is to say a change in load upon the activation of the deactivated outlet openings is taken into consideration. Specifically, the demanded charge pressure may also increase or decrease during the activation of the first turbine.

For example, it may even be the case that the demanded charge pressure decreases during the activation of the first turbine to an extent which renders an auxiliary drive for providing additional compressor power unnecessary, and which possibly even permits the use of the electric machine as a generator, even though the exhaust-gas flow supplied to the second turbine is decreasing.

In general, however, an auxiliary drive will be necessary in order to additionally output power to the compressor of the second exhaust-gas turbocharger, in particular if the charge pressure is to be maintained unchanged or increased, even though the exhaust-gas flow conducted through the second turbine is decreasing.

The statements made above with regard to the activation of the deactivated outlet openings or the activation of the first turbine apply analogously to the deactivation of the activated outlet openings or deactivation of the first turbine.

Embodiments of the method are provided in which, proceeding from activated outlet openings, the activated outlet openings are deactivated for the purposes of deactivating the first turbine, an increasing exhaust-gas flow rate conducted through the second turbine being compensated by virtue of the electric machine being used as generator in order to absorb power from the turbine of the second exhaust-gas turbocharger, such that a demanded charge pressure is provided.

Embodiments of the method are provided in which, proceeding from activated outlet openings, the first turbine is deactivated, with the charge pressure being maintained, by virtue of the electric machine, as generator, absorbing such an amount of power from the turbine of the second exhaust-gas turbocharger that the charge pressure is maintained.

With regard to the above variants, a distinction can again be made between method variants in which a demanded charge pressure is provided and dynamic processes are taken into consideration, and variants in which the presently prevailing charge pressure is substantially kept unchanged, that is to say maintained.

For example, it may even be the case that the demanded charge pressure increases during the deactivation of the first turbine to an extent which renders an auxiliary drive for providing additional compressor power necessary, even though the exhaust-gas flow supplied to the second turbine is increasing. The use of the electric machine as a generator for preventing or dissipating charge pressure peaks is then omitted.

In general, however, a generator will be necessary in order to absorb power from the turbine of the second exhaust-gas turbocharger, in particular if the charge pressure is to be maintained unchanged or reduced, even though the exhaust-gas flow conducted through the second turbine is increasing.

Below, in particular, the different variants of activation and deactivation of the switchable outlet openings will be discussed.

In this context, embodiments of the method are provided in which, proceeding from deactivated outlet openings, the first turbine is activated by virtue of the switchable outlet valves associated with the switchable outlet openings being successively activated. In the above embodiment, upon the activation of the first turbine, the switchable outlet openings, that is to say the switchable outlet valves associated with the switchable outlet openings, are activated not simultaneously but gradually.

In this approach, the number of activated outlet openings is successively increased upon the activation of the first turbine. In this way, the exhaust-gas flow rate that is discharged from the cylinders via the activated outlet openings is, upon the activation of the first turbine, likewise increased successively, that is to say gradually, and not to the full extent in an abrupt manner as in the prior art. As a result, the exhaust-gas flow conducted through the second turbine also does not decrease abruptly upon the activation of the first turbine, as a result of which a charge-pressure drop or torque drop that must be eliminated according to the disclosure is less pronounced.

Upon the activation of the switchable outlet openings for the purposes of activating the first turbine, the exhaust-gas flow admitted to the first turbine is increased gradually. In this case, the rotor of the activated turbine is accelerated gradually. During this run-up phase, there is adequate time available for the compressor of the first exhaust-gas turbocharger to itself participate in the build-up of the charge pressure, that is to say to itself generate charge pressure. The transient behavior of the exhaust-gas turbocharging arrangement upon the activation of the first turbine is improved considerably, in particular because the second compressor, during this transition phase, provides the demanded charge pressure in undiminished and undisrupted fashion. This is achieved by way of a successive activation of the activatable outlet openings, which permits a successive increase of the exhaust-gas flow supplied to the first turbine.

Here, embodiments of the method are provided in which the first turbine is activated by virtue of the outlet valves associated with the switchable outlet openings being activated on a cylinder-by-cylinder basis. If, for example, each cylinder has one switchable outlet opening, it is initially the case that the outlet opening of a first cylinder is activated, with this subsequently being repeated successively for the remaining cylinders.

In this context, embodiments of the method are provided in which the first turbine is activated by virtue of the outlet valves associated with the switchable outlet openings being activated in successive working cycles. This method variant constitutes the fastest possible activation of the first turbine in the case of the successive activation of the switchable outlet valves.

In this context, embodiments of the method may also be provided in which the first turbine is activated by virtue of the outlet valves associated with the switchable outlet openings being activated at intervals of a predefinable number of working cycles. The outlet valves associated with the switchable outlet openings may be activated for example at intervals of two or three working cycles. The interval may also vary, for example become progressively smaller, in the case of multiple switchable outlet openings.

Embodiments of the method are provided in which a deactivated outlet valve deactivates and shuts off the associated outlet opening such that no exhaust gas is supplied to the deactivated first turbine. In this case, exhaust gas is no longer supplied to the deactivated turbine, that is to say the impingement of exhaust gas on the first turbine is prevented entirely. This approach is however less advantageous with regard to maintaining a minimum rotational speed of the deactivated first turbine.

Therefore, embodiments of the method are also provided in which a deactivated outlet valve is operated with a reduced lift $\Delta h_{low}$, where $\Delta h_{low} < \Delta h_{max}$, during opening, such that the exhaust-gas flow rate supplied to the deactivated first turbine is reduced.

In the above method variant, in the case of the first turbine being deactivated, the valves of the switchable outlet openings are not deactivated in the true sense but continue to be constantly operated and actuated with a reduced lift $\Delta h_{low}$.

The deactivated first turbine then has a reduced exhaust-gas flow rate supplied to it, this being achieved with the use of the switchable outlet valves associated with the switchable outlet openings, specifically by way of a reduction of the lift of the associated outlet valves.

In this way, the rotational speed of the deactivated first turbine falls to a lesser extent, and a minimum rotational speed of the charger shaft can be ensured or maintained. The response behavior is improved. A further advantage is obtained.

If the supply of exhaust gas to the deactivated first turbine is stopped entirely, the seal of the bearing arrangement of the oil-lubricated charger shaft can leak owing to the decreasing rotational speed of said charger shaft. An oil leakage has severe disadvantages both on the exhaust-gas side and on the intake side. If oil passes via the switchable first turbine into the exhaust system, exhaust-gas aftertreatment systems provided downstream, that is to say catalytic converters and particle filters, are contaminated with oil, whereby the conversion rate of said exhaust-gas aftertreatment systems can be severely impaired. It may even be the case that the service life of the exhaust-gas aftertreatment systems is shortened, wherein the functionality of said exhaust-gas aftertreatment systems may basically also be put at risk. If oil passes via the associated first compressor into the intake system, the oil-contaminated fresh charge supplied to the cylinders adversely affects the combustion process, whereby, in particular, the untreated particle emissions can greatly increase. The oil may also be deposited on the inner walls of the intake system and impair the flow conditions in the intake system and/or in the compressor, and contaminate a charge-air cooler arranged downstream.

For the operation of an internal combustion engine in which a switchable outlet valve is an outlet valve which is adjustable with regard to the valve lift $\Delta h$, embodiments of the method are provided in which a deactivated outlet valve is activated by virtue of the associated valve lift being progressively increased to the valve lift $\Delta h_{max}$.

If lifting valves are used which can not only be activated and deactivated but can also furthermore be adjusted with regard to the valve lift $\Delta h$, the valve lift $\Delta h$ can be successively increased. In this way, the exhaust-gas flow that is discharged from a cylinder via an activated outlet opening can be increased successively, that is to say gradually, and does not need to be realized to the full extent in an abrupt manner.

An outlet valve which is adjustable in the above sense with regard to the valve lift $\Delta h$ may be a lifting valve which permits at least three different valve lifts $\Delta h_1$, $\Delta h_2$, $\Delta h_3$. Such a lifting valve which is adjustable in terms of the valve lift $\Delta h$ makes it possible, according to the disclosure, to realize not only the deactivated state without lift or with reduced lift $\Delta h_{low}$ and the activated mode with normal lift $\Delta h_{max}$, but also at least one further actuation mode with reduced lift or multiple further actuation modes with different lifts. In this case, lift is regarded as, and refers to, the maximum lift of the valve as the valve lift curve in the respective mode is passed through.

For the operation of an internal combustion engine in which a switchable outlet valve is an outlet valve which is adjustable in a two-stage fashion with regard to the valve lift $\Delta h$, method variants may be provided in this context wherein a deactivated outlet valve is activated by virtue of the associated valve lift being increased to the valve lift $\Delta h_{max}$ in one step.

For the operation of an internal combustion engine in which a switchable outlet valve is an outlet valve which is adjustable in a multi-stage fashion with regard to the valve lift $\Delta h$, method variants may also be provided in this context wherein a deactivated outlet valve is activated by virtue of the associated valve lift being increased to the valve lift $\Delta h_{max}$ in stages.

Embodiments of the method are provided in which a deactivated outlet valve is opened, and the associated outlet opening opened up, for a shortened opening duration $\Delta t_{short}$ where $\Delta t_{short} < \Delta t_{max}$, such that the exhaust-gas flow rate supplied to the deactivated first turbine is reduced. The statements made further above in conjunction with the reduced lift $\Delta h_{low}$ apply analogously.

Embodiments of the method are provided in which a deactivated outlet valve is activated by virtue of the associated opening duration being lengthened to the opening duration $\Delta t_{max}$ successively, in stages or in a two-stage fashion.

When the first turbine is deactivated, it should be possible for the first compressor to be separated from the rest of the intake system in order that the second compressor does not impart a delivery action into the first compressor. For this purpose, a first shut-off element is arranged in the associated intake line downstream of the first compressor.

In order that the first compressor then, if appropriate, does not impart a delivery action counter to the resistance of the closed first shut-off element, a blow-off line may be provided, via which the charge air can escape or be discharged.

In this connection, embodiments of the method are therefore also provided in which a blow-off line is provided which branches off from the associated first intake line between the first compressor and the first shut-off element and in which there is arranged a second shut-off element, wherein said second shut-off element is preferably actuated in a manner dependent on the first shut-off element.

Embodiments of the method are provided in which a deactivated outlet valve is operated intermittently such that the associated outlet opening is held closed for a first predefinable number of working cycles and is operated, and thus opened, for a second predefinable number of working cycles, such that the exhaust-gas flow rate supplied to the deactivated first turbine is reduced by phased deactivation of the switchable outlet openings. The supply of exhaust gas to the first turbine is then not stopped entirely.

Then, even when the first turbine is deactivated, the valves of the switchable outlet openings are not held closed constantly but are opened in phases for one working cycle or for multiple working cycles, such that a low flow rate of exhaust gas is supplied to the deactivated turbine, and the rotational speed of the deactivated turbine falls to a lesser extent.

Thus, a supercharged internal combustion engine for carrying out a method of a type described above includes at least one cylinder head with at least two cylinders, in which internal combustion engine each cylinder has at least two outlet openings for the discharge of the exhaust gases, at least one of which is in the form of a switchable outlet opening, each outlet opening being adjoined by an exhaust line for the discharge of the exhaust gases via an exhaust-gas discharge system, an intake system for supplying charge air to the at least two cylinders is provided, at least two exhaust-gas turbochargers are provided, each exhaust-gas turbocharger comprising a turbine arranged in the exhaust-gas discharge system and a compressor arranged in the intake system, the compressors of the at least two exhaust-gas turbochargers are arranged in parallel in the intake system, each compressor being arranged in a separate intake line of the intake system, and the separate intake lines merging, downstream of the compressors, to form an overall intake line, the exhaust lines of the switchable outlet openings of the at least two cylinders merge, with the formation of a first exhaust manifold, to form a first overall exhaust line which is connected to the turbine of the first exhaust-gas turbocharger, the exhaust lines of the other outlet openings of the at least two cylinders merge, with the formation of a second exhaust manifold, to form a second overall exhaust line which is connected to the turbine of the second exhaust-gas turbocharger, each switchable outlet opening is equipped with a switchable outlet valve, a deactivated outlet valve shutting off the associated outlet opening and an activated outlet valve moving between an open position and a closed position so as to realize a valve lift $\Delta h_{max}$, and in so doing opening up the associated outlet opening during an opening duration $\Delta t_{max}$, and an exhaust-gas recirculation arrangement is provided. The internal combustion engine includes an electric machine which is at least connectable in terms of drive to the second exhaust-gas turbocharger, which electric machine is suitable, as an auxiliary drive, for additionally outputting power to the compressor of the second exhaust-gas turbocharger in order to increase the charge pressure or, as a generator, for absorbing power from the turbine of the second exhaust-gas turbocharger in order to lower the charge pressure.

That which has been stated in conjunction with the method according to the disclosure likewise applies to the internal combustion engine according to the disclosure.

Embodiments of the internal combustion engine are provided in which a first shut-off element is arranged, downstream of the compressor of the first exhaust-gas turbocharger, in the associated first intake line.

In the present case, when the first turbine is deactivated, the first compressor can be separated from the rest of the intake system in order that the second compressor does not impart a delivery action into the first compressor. For this purpose, a first shut-off element is arranged in the associated intake line downstream of the first compressor, which first shut-off element serves for the deactivation of said compressor.

The first compressor is not actively driven when the turbine is deactivated. In order that the first compressor then, if appropriate, does not impart a delivery action counter to the resistance of the closed first shut-off element, a blow-off line is provided, via which the charge air can escape or be discharged.

In this connection, embodiments of the internal combustion engine are therefore also provided in which a blow-off line is provided which branches off from the associated first intake line between the first compressor and the first shut-off element and in which there is arranged a second shut-off element.

Here, embodiments of the internal combustion engine are provided in which the blow-off line opens into the other intake line upstream of the second compressor.

The fact that, in the present case, the blow-off line opens out into the intake system upstream of the second compressor has advantages, because negative pressure generally prevails upstream of the second compressor, whereby a pressure gradient is realized, by means of which the delivery of the charge air compressed by the first compressor is assisted.

Embodiments of the internal combustion engine are provided in which at least one turbine is in the form of a wastegate turbine, a bypass line branching off from the exhaust-gas discharge system upstream of said turbine and a shut-off element being provided in the bypass line.

Embodiments of the internal combustion engine are also provided in which at least one turbine has a variable turbine geometry, which permits extensive adaptation to the respective operating point by means of adjustment of the turbine geometry or of the effective turbine cross section. Here, guide blades for influencing the flow direction are arranged upstream of the impeller of the turbine. In contrast to the impeller blades of the rotating impeller, the guide blades do not rotate with the shaft of the turbine, that is to say with the impeller. The guide blades are duly arranged so as to be stationary but not so as to be completely immovable, rather so as to be rotatable about their axis such that the flow approaching the impeller blades can be influenced.

In contrast, if a turbine has a fixed, invariable geometry, the guide blades are not only stationary but rather also completely immovable, that is to say rigidly fixed.

Embodiments of the internal combustion engine are provided in which the exhaust lines of the at least two cylinders merge to form the overall exhaust lines within the at least one cylinder head.

The cylinder head of a supercharged internal combustion engine is basically a component that is subject to high thermal and mechanical loading. In particular, with the integration of the exhaust manifolds, the thermal loading of the internal combustion engine and of the cylinder head is increased yet further, such that increased demands are to be placed on the cooling arrangement. Embodiments of the supercharged internal combustion engine are therefore provided in which a liquid-type cooling arrangement is provided.

FIG. 1 shows example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space there-between and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example.

FIG. 1 schematically shows an embodiment of a supercharged internal combustion engine 1 which is equipped with two exhaust-gas turbochargers 8, 9. Each exhaust-gas turbocharger 8, 9 comprises a turbine 8a, 9a and a compressor 8b, 9b. The hot exhaust gas expands in the turbines 8a, 9a with a release of energy. The compressors 8b, 9b compress the charge air which is supplied to the cylinders 3 via intake system 11, charge-air cooler 10 and plenum 12, as a result of which the internal combustion engine 1 is supercharged. A first exhaust-gas turbocharger 8 comprises a first turbine 8a and a first compressor 8b. A second exhaust gas turbocharger 9 comprises a second turbine 9a and a second compressor 9b.

Said internal combustion engine is a four-cylinder in-line engine 1 in which the four cylinders 3 are arranged along the longitudinal axis of the cylinder head 2, that is to say in a line.

Each cylinder 3 has two outlet openings 4 configured for expelling exhaust gas. The two outlet openings 4 for each cylinder include a first opening 4a and a second opening 4b which are adjoined by respective exhaust lines 5a, 5b for discharging the exhaust gases via an exhaust-gas discharge system 5. In each case the first outlet opening 4a of each cylinder 3 is in the form of a switchable outlet opening, which is activated only when the first turbine 8a arranged downstream is to be activated; for example if the exhaust-gas flow rate exceeds a predefinable exhaust-gas flow rate.

The turbine 8a of the first exhaust-gas turbocharger 8, that is to say the first turbine 8a, is designed as a wastegate turbine. That is to say, upstream of the first turbine 8a, a first bypass line, in which there is arranged a shut-off element, branches off from the associated first overall exhaust line 7a. Said first bypass line opens into the overall exhaust line 7a again downstream of the first turbine 8a.

The exhaust lines 5a of the switchable outlet openings 4a of all the cylinders 3 merge, with the formation of a first exhaust manifold 6a, to form a first overall exhaust line 7a which is connected to the first turbine 8a of the first exhaust-gas turbocharger 8, which thus functions as an activatable turbine.

The exhaust lines 5b of the second outlet openings 4b of all the cylinders 3 merge, with the formation of a second exhaust manifold 6b, to form a second overall exhaust line 7b which is connected to the second turbine 9a of the second exhaust-gas turbocharger 9.

The turbine 9a of the second exhaust-gas turbocharger 9, that is to say the second turbine 9a, is a wastegate turbine. That is to say, upstream of the second turbine 9a, a second bypass line 9c, in which a third shut-off element 9d is arranged (also referred to as a wastegate), branches off from the exhaust-gas discharge system 5. The second bypass line 9c opens into the exhaust-gas discharge system 5 again downstream of the second turbine 9a.

The internal combustion engine 1 has an intake system 11 for the supply of the charge air to the cylinders 3, wherein the compressors 8b, 9b of the turbochargers 8, 9 are arranged in parallel in the intake system 11. The first compressor 8b is arranged in a first intake line 11a, and the second compressor 9b is arranged in a second intake line 11b. The intake lines 11a, 11b merge downstream of the compressors 8b, 9b to form an overall intake line.

A first shut-off element 13a is arranged downstream of the first compressor 8b in the associated first intake line 11a (illustrated by dashed lines), such that, when the first turbine 8a is deactivated, the first compressor 8b can be separated entirely from the rest of the intake system 11, that is to say deactivated, and the second compressor 9b does not impart a delivery action into the first compressor 8b. In order that the first compressor 8b does not have to impart a delivery action counter to the resistance of the closed first shut-off element 13a, a blow-off line 14 is provided which each branches off from the first intake line 11a between the first compressor 8b and the first shut-off element 13a and in which there is arranged a second shut-off element 13b (illustrated by dotted lines). Via the blow-off line 14, charge air can be delivered into the second intake line 11b upstream of the second compressor 9b. In some examples, the second shut-off element 13b is preferably actuated, that is to say controlled, in a manner dependent on the first shut-off element 13a.

Each switchable outlet opening 4a is equipped with a switchable lifting valve, wherein a deactivated outlet valve shuts off and blocks the associated outlet opening 4a. An activated outlet valve moves between an open position and a closed position so as to realize a valve lift $\Delta h_{max}$, and in so doing opens up the associated outlet opening 4a for an opening duration $\Delta t_{max}$.

If indicated, in particular upon the activation or deactivation of the first turbine 8a, an electric machine 9c which is connected in terms of drive to the second exhaust-gas turbocharger 9 serves for providing the requested charge pressure.

The electric machine 9c can, as an auxiliary drive, additionally output power to the second compressor 9b of the second exhaust-gas turbocharger 9 in order to ensure the generation of an adequately high charge pressure, or as a generator, can absorb power from the second turbine 9a of the second exhaust-gas turbocharger 9 in order to lower the charge pressure and dissipate pressure peaks.

Proceeding from deactivated outlet openings 4a, the deactivated outlet openings 4a are activated for the purposes of activating the first turbine 8a. Here, the decrease in the exhaust-gas flow rate conducted through the second turbine 9a is compensated by virtue of the electric machine 9c, as an auxiliary drive, additionally outputting power to the second compressor 9b of the second exhaust-gas turbocharger 9, such that the demanded charge pressure can be provided.

In individual cases, the electric machine 9c, as the auxiliary drive, outputs such an amount of power to the second compressor 9b that the presently prevailing charge pressure is maintained.

Proceeding from activated outlet openings 4a, the activated outlet openings 4a are deactivated for the purposes of deactivating the first turbine 8a. Here, the increase in the exhaust-gas flow rate conducted through the second turbine 9a is compensated by virtue of the electric machine 9c, as a generator, absorbing power from the second turbine 9a of the second exhaust-gas turbocharger 9. In this way, pressure peaks can be avoided, and the provided charge pressure can be limited.

In another example, proceeding from deactivated outlet openings 4a, for the purposes of activating the first turbine 8a, it is initially the case that, with the torque being maintained, the third shut-off element 9d in the second bypass line 9c is closed to a predefined extent and the cylinder fresh charge is influenced. To maintain the present torque, the cylinder fresh charge is maintained unchanged.

To be able to set the cylinder fresh charge or the charge air of the cylinder fresh charge, each cylinder 3 has at least one further at least partially variable valve drive, which may be provided at the inlet side and/or at the outlet side. By varying the timing, that is to say the valve closing time and/or the valve opening time, or the valve lift of the associated valve, it is possible to influence the cylinder fresh charge, that is to say the charge air mass, in particular the volumetric cylinder fresh charge, that is to say the volumetric air usage $V_z$.

A closure of the third shut-off element 9d in the second bypass line 9c leads to a higher charge pressure on the inlet side, which can be compensated by way of a reduction of the volumetric air usage $V_z$, that is to say by way of a reduction of the efficiency $\lambda_l$. The at least partially variable valve drives may consequently be adjusted such that the volumetric air usage $V_z$, that is to say the volumetric cylinder fresh charge, is reduced.

In a subsequent method step, the deactivated outlet openings 4a are then activated for the purposes of activating the first turbine 8a, wherein a decreasing exhaust-gas flow rate conducted through the second turbine 9a gives rise to a lower charge pressure on the inlet side, which is compensated by increasing the volumetric cylinder fresh charge $V_z$, that is to say by increasing the efficiency $\lambda_l$. For this purpose, the further at least partially variable valve drives are adjusted such that the demanded torque is provided, or the presently prevailing torque can be maintained.

The engine system may further include a control system. The control system may include a controller 112. The controller 112 is shown in FIG. 1 as a microcomputer, including microprocessor unit 102, input/output ports 104, an electronic storage medium for executable programs and calibration values shown as read only memory chip 106 in this particular example, random access memory 108, keep alive memory 110, and a data bus. Controller 112 may receive various signals from sensors coupled to engine 1, in addition to those signals previously discussed, including measurement of inducted mass air flow (MAF) from a mass air flow sensor; engine coolant temperature (ECT) from a temperature sensor coupled to a cooling sleeve; a profile ignition pickup signal (PIP) from a Hall effect sensor (or other type) coupled to a crankshaft of the engine; throttle position (TP) from a throttle position sensor; and absolute manifold pressure signal, MAP, from a MAP sensor. Engine speed signal, RPM, may be generated by controller 112 from signal PIP.

Storage medium read-only memory 106 can be programmed with computer readable data representing instructions executable by processor 102 for performing the methods described below as well as other variants that are anticipated but not specifically listed. Example methods are described with reference to FIG. 2.

The controller 112 receives signals from the various sensors of FIG. 1 and employs the various actuators of FIG. 1 to adjust engine operation based on the received signals and instructions stored on a memory of the controller. For example, in order to control boost/charge pressure, the controller may receive signals from various sensors indicating engine speed and load, and the controller may adjust one or more actuators each associated with a respective switchable outlet opening (e.g., exhaust valve actuators) based on the received signals such that the switchable outlet openings are activated or deactivated based on engine load, for example. In one example, to drive the primary compressor (second compressor of the second turbocharger) during conditions where sufficient exhaust flow is not available (e.g., during activation of the secondary turbocharger), the controller may receive signals from various sensors indicating exhaust gas mass flow, engine load, etc., and activate the motor of the electric auxiliary drive. In another example, to drive the primary compressor during conditions where sufficient exhaust flow is not available (e.g., during activation of the secondary turbocharger), the controller may receive signals from various sensors indicating exhaust gas mass flow, engine load, etc., and close a wastegate of the second turbine (e.g., the third shut-off valve 9d) and adjust a parameter of the partially variable valve drive.

In some examples, a belt integrated starter-generator (BISG) system 111 may be coupled to engine 1. The BISG system 111 may include a starter-generator motor coupled to a battery and coupled to the engine via a belt. In one example, the starter-generator motor may be a 48 volt motor and the battery may be a 48 volt battery. A DC-DC converter may convert the 48 V output from the motor to 12 V for usage in a subset of the vehicle's electrical components. The electric machine 9c may be powered by the 48 V BISG system 111. As such, in some examples, when the electric machine 9c is activated (e.g., a coil of a motor of the electric machine is energized), the motor torque of the motor of the BISG may be adjusted.

Thus, the system described above provides for a supercharged internal combustion engine, comprising at least one cylinder head with at least two cylinders, each cylinder having at least two outlet openings for discharge of exhaust gases, at least one of the at least two outlet openings of each cylinder in the form of a switchable outlet opening, each outlet opening being adjoined by an exhaust line for the discharge of the exhaust gases via an exhaust-gas discharge system; an intake system for supplying charge air to the at least two cylinders; a first exhaust gas exhaust-gas turbocharger comprising a first turbine arranged in the exhaust-gas discharge system and a first compressor arranged in the intake system; a second exhaust-gas turbocharger comprising a second turbine arranged in the exhaust-gas discharge system and a second compressor arranged in the intake system, the first compressor and second compressor arranged in parallel in the intake system, each compressor being arranged in a separate intake line of the intake system, and the separate intake lines merging, downstream of the first compressor and second compressor, to form an overall intake line, where the exhaust lines of the switchable outlet openings of the at least two cylinders merge, with the formation of a first exhaust manifold, to form a first overall exhaust line which is connected to the first turbine of the first exhaust-gas turbocharger, the exhaust lines of the other outlet openings of the at least two cylinders merge, with the formation of a second exhaust manifold, to form a second overall exhaust line which is connected to the second turbine of the second exhaust-gas turbocharger, and each switchable outlet opening is equipped with a switchable outlet valve, a deactivated outlet valve shutting off the associated outlet opening and an activated outlet valve moving between an open position and a closed position so as to realize a valve lift $\Delta h_{max}$, and in so doing opening up the associated outlet opening during an opening duration $\Delta t_{max}$; an exhaust-gas recirculation arrangement; and an electric machine which is at least connectable in terms of drive to the second exhaust-gas turbocharger, which electric machine is configured, as an auxiliary drive, for additionally outputting power to the second compressor of the second exhaust-gas turbocharger in order to increase the charge pressure or, as a generator, for absorbing power from the second turbine of the second exhaust-gas turbocharger in order to lower the charge pressure.

The engine may further comprise a first shut-off element arranged downstream of the first compressor of the first exhaust-gas turbocharger in the associated first intake line; and a blow-off line which branches off from the associated first intake line between the first compressor and the first shut-off element and in which there is arranged a second shut-off element, the blow-off line opening into the other intake line upstream of the second compressor. In an example, at least one turbine is in the form of a wastegate turbine, a bypass line branching off from the exhaust-gas discharge system upstream of the wastegate turbine and a shut-off element being provided in the bypass line.

Figure 2:
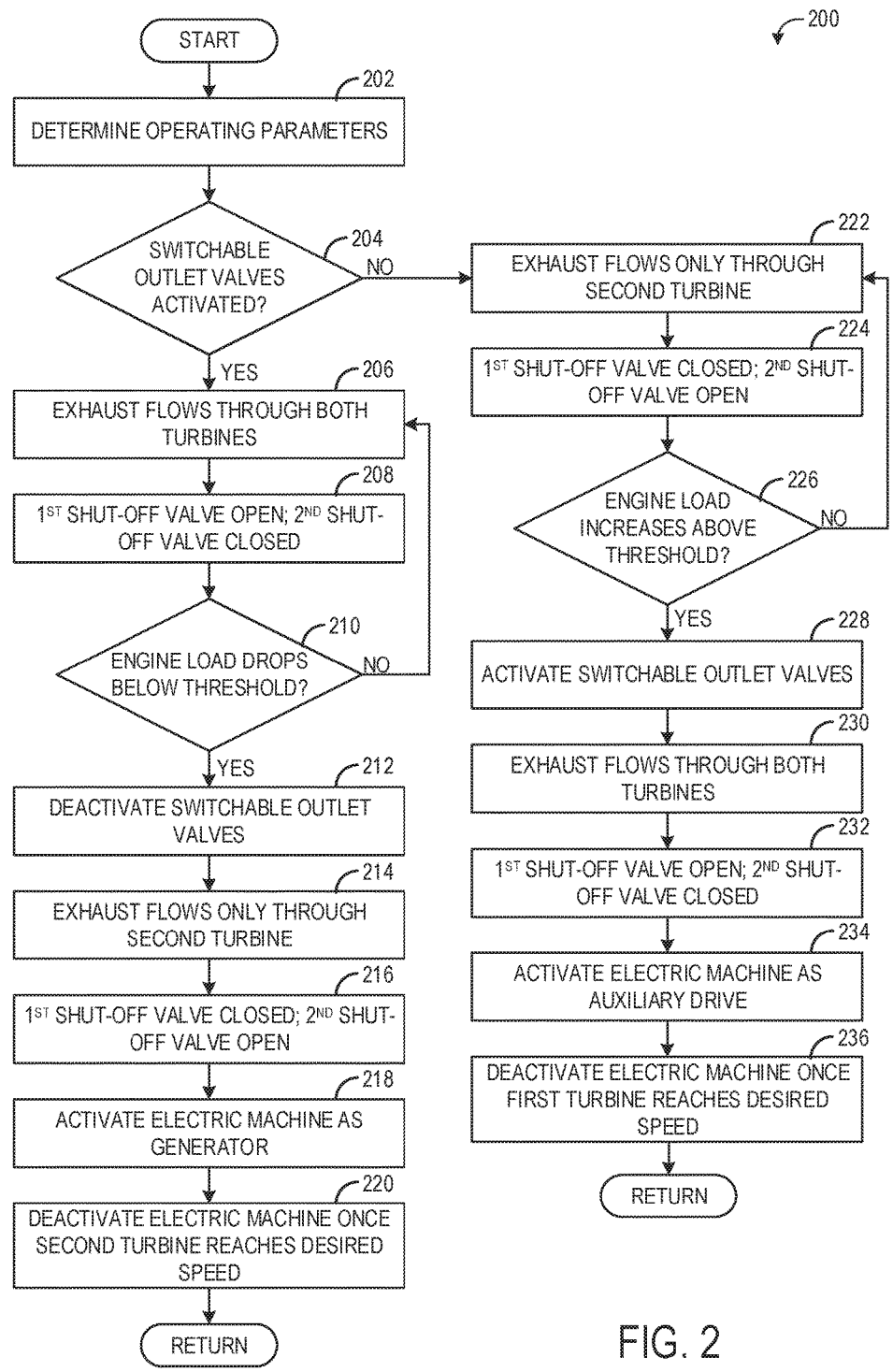
FIG. 2 is a flow chart illustrating a method for operating the engine of FIG. 1.

Turning now to FIG. 2, a flow chart illustrating a method 200 for operating an engine is presented. Method 200 may be carried out to operate the engine 1 of FIG. 1 in one example. Instructions for carrying out method 200 and the rest of the methods described herein may be executed by a controller based on instructions stored on a memory of the controller (e.g., controller 112) and in conjunction with signals received from sensors of the engine system, such as the sensors described above with reference to FIG. 1. The controller may employ engine actuators of the engine system to adjust engine operation, according to the methods described below.

At 202, method 200 includes determining operating parameters. The determined operating parameters may include engine speed, engine load, exhaust gas mass flow, switchable outlet valve status (e.g., activated or deactivated), and other parameters. At 204, method 200 includes determining if the switchable outlet valves are activated. The switchable outlets may include the outlet openings 4a of FIG. 1, which are coupled to a first turbine of a first turbocharger (e.g., turbine 8a of turbocharger 8 of FIG. 1), and the exhaust valves that control the openings may be activated, wherein the exhaust valves are actuated to allow exhaust gas to flow through the openings, or the exhaust valves may be deactivated, wherein the exhaust valves are not actuated and exhaust gas does not flow through the openings. The status of the valves may be estimated based on operating conditions (e.g., engine load) or the status of the valves may be determined based on feedback from exhaust valve position sensors, valve actuation mechanism status, or other parameter.

If the valves are not activated, method 200 proceeds to 222, which will be described in more detail below. If the valves are currently activated, exhaust is flowing through both turbines, as indicated at 206, due to all the exhaust valves being actuated. As indicated at 208, a first shut-off valve (e.g., valve 13a of FIG. 1) controlling flow of compressed intake air from a first compressor (e.g., compressor 8b) to the intake system of the engine is open and a second shut-off valve (e.g., valve 13b) controlling flow of compressed intake air from the first compressor to upstream of a second compressor is closed. As such, the first turbocharger is activated.

At 210, method 200 determines if engine load has dropped below a threshold load. The threshold load may be a suitable load below which additional boost provided by the first compressor is not needed to meet engine boost demand. In other examples, rather than assessing engine load, method 200 may determine if exhaust gas mass flow is below a threshold, engine boost and/or torque demands are below respective thresholds, or other suitable parameter that indicates if activation of the first turbine is needed to meet boost demand.

If engine load (or exhaust gas mass flow or other parameter) has not dropped below the threshold, method 200 continues to operate with the switchable outlet valves activated. If engine load does drop below the threshold, method 200 proceeds to 212 to deactivate the switchable outlet valves. Due to the drop in engine load and accompanying decrease in exhaust gas mass flow and decrease in demanded boost pressure, the boost pressure demand may be met with only one turbocharger. Thus, the switchable outlet valves are deactivated and exhaust then flows only through the second turbine, as indicated at 214. To fully deactivate the first turbine, the first shut-off valve may be closed and the second shut-off valve may be opened at 216. In this way, no exhaust may flow though the first turbine due to deactivation of the switchable outlet valves and losses due to operation of the first compressor may be minimized by routing any compressed air downstream of the first compressor to upstream of the second compressor. Further, in some examples, rather than completely deactivating the switchable outlet valves, the valve lift and/or duration may be reduced such that only a small amount of exhaust gas travels to the first turbine.

At 218, method 200 includes activating an electric machine as a generator. When the system transitions to operating with both turbochargers to operating with only one turbocharger, the active (second turbocharger) may transiently receive an increased amount of exhaust gas, which may drive the turbocharger to an over-speed event. Thus, to prevent engine torque disturbances or turbocharger degradation, the electric machine may be activated to absorb rotational energy of the second turbocharger shaft and convert the rotational energy to electricity which may be stored in a battery, for example. This acts to reduce the turbocharger shaft speed. To activate the electric machine, a clutch may be engaged to couple the electric machine to the second turbocharger. The electric machine may remain activated until a desired speed for the second turbine is reached, at which point the electric machine may be deactivated, as indicated at 220. In other examples, the electric machine may be deactivated based on another parameter, such as an amount of elapsed time, exhaust gas mass flow, boost pressure, etc. Method 200 then returns.

Returning to 204, if it is determined that the switchable outlet valves are currently deactivated, method 200 proceeds to 222 where exhaust flows through only the second turbine and the first shut-off valve is closed and the second shut-off valve is open, as indicated at 224. At 226, method 200 determines if engine load has increased above a threshold load (or if exhaust gas mass flow is above a threshold, boost demand is above a threshold, or other suitable determination). If no, method 200 continues to operate with the first turbine deactivated. If yes, method 200 proceeds to 228 to activate the switchable outlet valves. When the valves are activated, the valves are actuated such that exhaust gas flows out through the switchable openings and to the first turbine, and thus exhaust flows through both the first turbine and second turbine, as indicated at 230. The first shut-off valve is open and the second shut-off valve is closed at 232 so that compressed intake air from downstream of the first compressor travels to the intake system and then to the engine.

When the switchable outlet valves are initially activated after being deactivated, a transient drop in boost pressure may occur due to a reduction in the exhaust mass flow through the second turbine while the first turbine is spooling up. Thus, to minimize the torque disturbance, the electric machine is activated as an auxiliary drive at 234. To activate the electric machine as an auxiliary drive, a coil of a motor of the electric machine may be activated and the electric machine may be coupled to the shaft of the second turbocharger via a clutch. As a result, the motor of the electric machine may rotate the turbocharger shaft, thus maintaining desired speed of the second turbocharger. The electric machine may be deactivated once the first turbine reaches a desired speed, as indicated at 236, or in response to another suitable parameter. Method 200 then returns.

Thus, method 200 activates or deactivates a first turbine based on engine load, exhaust mass flow, demanded boost pressure, or other parameter. To activate the first turbine, deactivatable exhaust valves of the cylinders of the engine may be activated (e.g., actuated) such that exhaust gas from each cylinder flows to the first turbine as well as the second turbine. To deactivate the first turbine, the deactivatable exhaust valves may be deactivated (e.g., not actuated or actuated with a reduced amount or duration of lift) such that no exhaust gas (or a reduced amount of exhaust gas) from each cylinder flows to the first turbine (but exhaust gas still flows to the second turbine).

During the transition from an activated first turbine to a deactivated first turbine, and hence during the transition from actuating the exhaust valves to not actuating the exhaust valves, a transient over-speed event of the second turbocharger may occur. To prevent the over-speed event, the electric machine may be operated as a generator, where the electric machine converts rotational energy of the second turbocharger shaft to electricity. In doing so, the speed of the second turbocharger will be reduced or maintained.

During the transition from a deactivated first turbine to an activated first turbine, and hence during the transition from not actuating the exhaust valves to actuating the exhaust valves, a transient under-speed event of the second turbocharger may occur. To prevent the under-speed event, the electric machine may be operated as an auxiliary drive, where a motor of the electric machine rotates the second turbocharger shaft. In doing so, the speed of the second turbocharger will be maintained or increased.

While method 200 described above activates the electric machine once the transition from an activated first turbine to a deactivated first turbine has begun (or once the transition from a deactivated first turbine to an activated first turbine has begun), in some examples the controller may predict that a transition is about to occur and proactively activate the electric machine. For example, the controller may monitor engine load and if engine load is changing by a given amount, the electric machine may be activated, even if engine load has not yet crossed the threshold for transitioning the state of the first turbine.

Thus, as explained above, in parallel sequential turbocharging systems the exhaust volumetric flow is shared between both turbines or lead to one turbine only, for example by using switchable exhaust valves on engines with two or more exhaust valves, so that each second exhaust valve of each cylinder can be deactivated to cut off the second turbocharger from exhaust gas flow. To avoid boost pressure fluctuations during switching operation, an electric machine may be activated. However, in engine configurations where the turbochargers are wastegate turbochargers, the position of the wastegate as well as the valve timing may be controlled to avoid these boost pressure fluctuations.

Accordingly, as described in more detail below, before switching on the secondary turbocharger, the wastegate of the primary turbocharger is closed to a well-defined degree (e.g., fully closed) in combination with an appropriate cam timing (intake and/or exhaust), enabling a sufficient engine generic volumetric efficiency decrease, so that the increase in boost pressure due to the more closed wastegate will be compensated completely and the resulting air mass flow through the engine stays unchanged, resulting in constant engine torque.

At this operating condition the primary turbocharger speed is significantly higher than it needs to be with standard cam timing, so that there is a so-called turbocharger speed reserve.

If switching on the secondary turbocharger now, the resulting decrease of turbine mass flow of the primary turbocharger can be compensated by adjusting the cam timing to improved engine generic volumetric efficiency so that the over-revving primary turbocharger can deliver immediately the required boost pressure in spite of lower exhaust enthalpy to keep the resulting torque still constant during the ramp-up of the secondary turbocharger.

For switching off the secondary turbocharger this procedure could be realized in reverse, avoiding over-boost peaks when the total exhaust mass flow shared between the two turbochargers is then directed to the primary turbocharger only.

Figure 3:
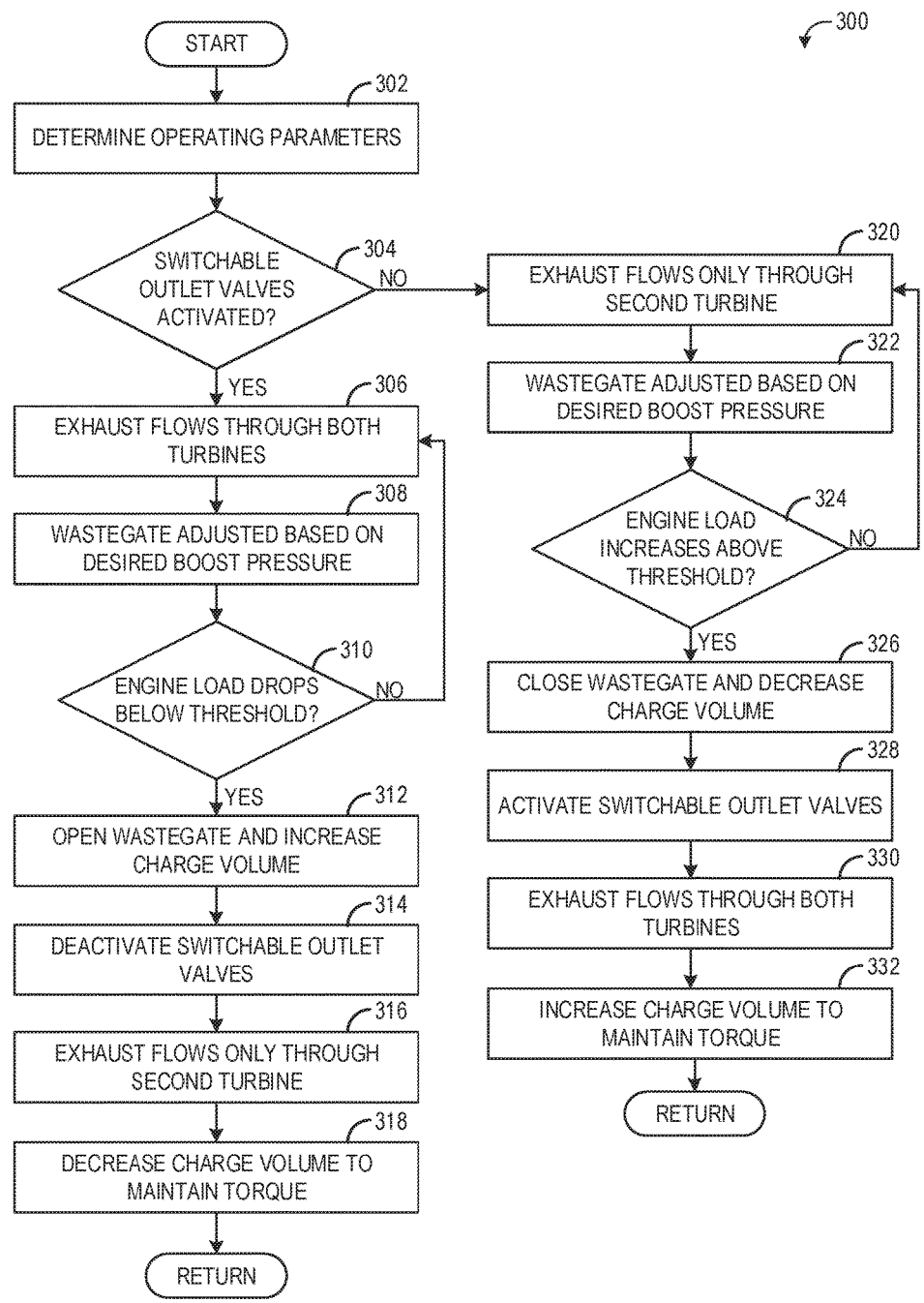
FIG. 3 is a flow chart illustrating another method for operating the engine of FIG. 1.

FIG. 3 shows a flow chart illustrating a method 300 for operating an engine. Method 300 may be carried out to operate the engine 1 of FIG. 1 in one example. Instructions for carrying out method 300 may be executed by a controller based on instructions stored on a memory of the controller (e.g., controller 112) and in conjunction with signals received from sensors of the engine system, such as the sensors described above with reference to FIG. 1. The controller may employ engine actuators of the engine system to adjust engine operation, according to the methods described below.

At 302, method 300 includes determining operating parameters. The determined operating parameters may include engine speed, engine load, exhaust gas mass flow, switchable outlet valve status (e.g., activated or deactivated), and other parameters. At 304, method 300 includes determining if the switchable outlet valves are activated. The switchable outlets may include the outlet openings 4a of FIG. 1, which are coupled to a first turbine of a first turbocharger (e.g., turbine 8a of turbocharger 8 of FIG. 1), and the exhaust valves that control the openings may be activated, wherein the exhaust valves are actuated to allow exhaust gas to flow through the openings, or the exhaust valves may be deactivated, wherein the exhaust valves are not actuated and exhaust gas does not flow through the openings. The status of the valves may be estimated based on operating conditions (e.g., engine load) or the status of the valves may be determined based on feedback from exhaust valve position sensors, valve actuation mechanism status, or other parameter.

If the valves are not activated, method 300 proceeds to 320, which will be described in more detail below. If the valves are currently activated, exhaust is flowing through both turbines, as indicated at 306, due to all the exhaust valves being actuated. Additionally, a first shut-off valve (e.g., valve 13a of FIG. 1) controlling flow of compressed intake air from a first compressor (e.g., compressor 8b) to the intake system of the engine is open and a second shut-off valve (e.g., valve 13b) controlling flow of compressed intake air from the first compressor to upstream of a second compressor is closed. As such, the first turbocharger is activated. When the valves are activated and exhaust flows through both turbines, a wastegate of the second turbine (e.g., third shut-off valve 9d) may adjusted to provide desired boost pressure, as indicated at 308.

At 310, method 300 determines if engine load has dropped below a threshold load. The threshold load may be a suitable load below which additional boost provided by the first compressor is not needed to meet engine boost demand. In other examples, rather than assessing engine load, method 300 may determine if exhaust gas mass flow is below a threshold, engine boost and/or torque demands are below respective thresholds, or other suitable parameter that indicates if activation of the first turbine is needed to meet boost demand.

If engine load (or exhaust gas mass flow or other parameter) has not dropped below the threshold, method 300 continues to operate with the switchable outlet valves activated. If engine load does drop below the threshold, method 300 proceeds to 312 to open the wastegate and increase cylinder charge volume. The wastegate may be fully opened, or it may be moved to a predetermined open position. To increase the cylinder charge volume, one or more parameters of a cylinder valve of each cylinder may be adjusted, such as valve lift, timing, or duration, to reduce the amount of charge air inducted into the cylinders. The adjusted cylinder valves may include the intake valves or the non-switchable (but partially variable) exhaust valves. In this way, prior to deactivation of the first turbine, the speed of the second turbine may be reduced (by opening the wastegate) while torque demand is met by increasing the charge volume.

At 314, method 300 deactivates the switchable outlet valves. Due to the drop in engine load and accompanying decrease in exhaust gas mass flow and decrease in demanded boost pressure, the boost pressure demand may be met with only one turbocharger. Thus, the switchable outlet valves are deactivated and exhaust then flows only through the second turbine, as indicated at 316. To fully deactivate the first turbine, the first shut-off valve may be closed and the second shut-off valve may be opened. In this way, no exhaust may flow though the first turbine due to deactivation of the switchable outlet valves and losses due to operation of the first compressor may be minimized by routing any compressed air downstream of the first compressor to upstream of the second compressor. Further, in some examples, rather than completely deactivating the switchable outlet valves, the valve lift and/or duration may be reduced such that only a small amount of exhaust gas travels to the first turbine.

At 318, method 300 includes maintaining torque by reducing the charge volume. When the system transitions to operating with both turbochargers to operating with only one turbocharger, the active (second turbocharger) may transiently receive an increased amount of exhaust gas, which may drive the turbocharger to an over-speed event. Thus, to prevent engine torque disturbances or turbocharger degradation, the wastegate may be proactively opened and torque controlled by increasing charge volume, for example. This acts to reduce the turbocharger shaft speed. However, once the first turbine is deactivated and all exhaust is flowing to the second turbine, the charge volume may be reduced to prevent a subsequent over-speed event. When the charge volume is reduced (via adjusting of the cylinder valves), the wastegate may also be adjusted based on desired boost pressure. Method 300 then returns.

Returning to 304, if it is determined that the switchable outlet valves are currently deactivated, method 300 proceeds to 320 where exhaust flows through only the second turbine and the first shut-off valve is closed and the second shut-off valve is open. At 322, method 300 adjusts a position of the wastegate of the second turbine based on desired boost pressure. At 324, method 300 determines if engine load has increased above a threshold load (or if exhaust gas mass flow is above a threshold, boost demand is above a threshold, or other suitable determination). If no, method 300 continues to operate with the first turbine deactivated. If yes, method 300 proceeds to 326 to close the wastegate (which may include fully closing the wastegate in some examples) and decrease charge volume, for example by adjusting the actuating cylinder valves. In doing so, the second turbine may be sped up without generating additional torque. At 328, method 300 activates the switchable outlet valves. When the valves are activated, the valves are actuated such that exhaust gas flows out through the switchable openings and to the first turbine, and thus exhaust flows through both the first turbine and second turbine, as indicated at 330. The first shut-off valve is open and the second shut-off valve is closed so that compressed intake air from downstream of the first compressor travels to the intake system and then to the engine.

When the switchable outlet valves are initially activated after being deactivated, a transient drop in boost pressure may occur due to a reduction in the exhaust mass flow through the second turbine while the first turbine is spooling up. Thus, to minimize the torque disturbance, wastegate is proactively closed to increase turbine speed and torque is maintained by reducing charge volume. However, once the transition to operating with both turbochargers occurs, the charge volume may be increased to maintain torque, as indicated at 332. During this time, the wastegate may again be controlled based on desired boost pressure. Method 300 then returns.

Thus, method 300 activates or deactivates a first turbine based on engine load, exhaust mass flow, demanded boost pressure, or other parameter. To activate the first turbine, deactivatable exhaust valves of the cylinders of the engine may be activated (e.g., actuated) such that exhaust gas from each cylinder flows to the first turbine as well as the second turbine. To deactivate the first turbine, the deactivatable exhaust valves may be deactivated (e.g., not actuated or actuated with a reduced amount or duration of lift) such that no exhaust gas (or a reduced amount of exhaust gas) from each cylinder flows to the first turbine (but exhaust gas still flows to the second turbine).

During the transition from an activated first turbine to a deactivated first turbine, and hence during the transition from actuating the exhaust valves to not actuating the exhaust valves, a transient over-speed event of the second turbocharger may occur. To prevent the over-speed event, the wastegate may be opened and charge volume may be increased. In doing so, the speed of the second turbocharger will be reduced or maintained.

During the transition from a deactivated first turbine to an activated first turbine, and hence during the transition from not actuating the exhaust valves to actuating the exhaust valves, a transient under-speed event of the second turbocharger may occur. To prevent the under-speed event, the wastegate may be closed and the charge volume decreased. In doing so, the speed of the second turbocharger will be maintained or increased.

Embodiments of the method are provided in which, proceeding from deactivated outlet openings, the first turbine is activated in that, with the torque being maintained, the wastegate (second shut-off element) is closed to a predefinable extent and further at least partially variable valve drives are adjusted to an indicated extent for the purposes of maintaining the cylinder fresh charge.

In the present case, the preparatory measures are performed while maintaining the torque, that is to say in this phase of the method, the internal combustion engine is operated in steady-state fashion at least with regard to the torque, that is to say with a substantially unchanged cylinder fresh charge. In the method according to the disclosure generally, however, the preparatory measures are performed while outputting a demanded torque. The latter wording thus also encompasses dynamic processes, that is to say a change in load during the performing of the preparatory measures. The torque and the charge-air flow rate supplied to the cylinders can be kept unchanged, that is to say maintained, or controlled in accordance with demand, that is to say changed.

Embodiments of the method are also provided in which, proceeding from deactivated outlet openings, the first turbine is activated in that the deactivated outlet openings are activated for the purposes of activating the first turbine, a decreasing exhaust-gas flow rate conducted through the second turbine being compensated, by increasing the volumetric cylinder fresh charge by way of adjustment of further at least partially variable valve drives, to such an extent that a demanded torque is provided or a presently prevailing torque is kept unchanged.

The method according to the disclosure is generally referred to as involving a setting of the cylinder fresh charge. Upon the activation of the first turbine, however, the volumetric cylinder fresh charge may be increased because the charge pressure falls when the exhaust-gas flow conducted through the second turbine decreases.

Nevertheless, dynamic processes are also encompassed by the general method according to the disclosure. That is to say, a change in load upon the activation of the deactivated outlet openings is taken into consideration. Specifically, the demanded torque may also decrease during the activation of the first turbine, specifically also to an extent which not only results in a reduction of the cylinder fresh charge but may also necessitate a decrease in the volumetric cylinder fresh charge, despite the fact that the exhaust-gas flow supplied to the second turbine decreases and the charge pressure falls.

The advantages described above with regard to the activation of the deactivated outlet openings or the activation of the first turbine also apply analogously to the deactivation of the activated outlet openings or deactivation of the first turbine.

Therefore, embodiments of the method are also provided in which, proceeding from activated outlet openings, the first turbine is deactivated in that, with the provision of a demanded torque, the second shut-off element in the second bypass line of the turbine of the second exhaust-gas turbocharger is opened to a predefinable extent and further at least partially variable valve drives are adjusted for the purposes of setting a designated cylinder fresh charge, and the activated outlet openings are deactivated for the purposes of deactivating the first turbine, an increasing exhaust-gas flow rate conducted through the second turbine being compensated, by setting of the cylinder fresh charge by way of adjustment of further at least partially variable valve drives, to such an extent that a demanded torque is provided.

In this context, embodiments of the method are provided in which, proceeding from activated outlet openings, the first turbine is deactivated in that, with the torque being maintained, the second shut-off element is opened to a predefinable extent and further at least partially variable valve drives are adjusted to a designated extent for the purposes of maintaining the cylinder fresh charge.

In this context, embodiments of the method are also provided in which, proceeding from activated outlet openings, the first turbine is deactivated in that the activated outlet openings are deactivated for the purposes of activating the first turbine, an increasing exhaust-gas flow rate conducted through the second turbine being compensated, by decreasing the volumetric cylinder fresh charge by way of adjustment of further at least partially variable valve drives, to such an extent that a demanded torque is provided or a presently prevailing torque is kept unchanged.

With regard to the above variants, a distinction can again be made between method variants in which a demanded torque is provided and dynamic processes are taken into consideration, and variants in which the presently prevailing torque is substantially kept unchanged, that is to say maintained.

The method described above may be carried out in a supercharged internal combustion engine having at least one cylinder head with at least two cylinders, in which internal combustion engine each cylinder has at least two outlet openings for the discharge of the exhaust gases, at least one of which is in the form of a switchable outlet opening, each outlet opening being adjoined by an exhaust line for the discharge of the exhaust gases via an exhaust-gas discharge system, an intake system for supplying charge air to the at least two cylinders is provided, at least two exhaust-gas turbochargers are provided, each exhaust-gas turbocharger comprising a turbine arranged in the exhaust-gas discharge system and a compressor arranged in the intake system, the compressors of the at least two exhaust-gas turbochargers are arranged in parallel in the intake system, each compressor being arranged in a separate intake line of the intake system, and the separate intake lines merging, downstream of the compressors, to form an overall intake line, the exhaust lines of the switchable outlet openings of the at least two cylinders merge, with the formation of a first exhaust manifold, to form a first overall exhaust line which is connected to the turbine of the first exhaust-gas turbocharger, the exhaust lines of the other outlet openings of the at least two cylinders merge, with the formation of a second exhaust manifold, to form a second overall exhaust line which is connected to the turbine of the second exhaust-gas turbocharger, a first shut-off element is arranged, downstream of the compressor of the first exhaust-gas turbocharger, in the associated first intake line, the turbine of the second exhaust-gas turbocharger is in the form of a wastegate turbine, a second bypass line branching off from the exhaust-gas discharge system upstream of said second turbine and a second shut-off element being provided in the second bypass line, and each switchable outlet opening is equipped with a switchable outlet valve of an at least partially variable valve drive, a deactivated outlet valve shutting off the associated outlet opening and an activated outlet valve moving between an open position and a closed position so as to realize a valve lift $\Delta h_{max}$, and in so doing opening up the associated outlet opening during an opening duration $\Delta t_{max}$. Each cylinder is, for the purposes of setting the charge air of a cylinder fresh charge, equipped with at least one further at least partially variable valve drive, having a valve which is movable between a valve closed position and a valve open position, so as to perform a valve lift, in order to open up or shut off a valve-specific opening of the cylinder during the course of a charge exchange.

With regard to the adjustability of the further at least partially variable valve drives, that which has been stated in conjunction with the switchable outlet openings, or that which has been stated in conjunction with the at least partially variable valve drives thereof, applies.

Embodiments of the internal combustion engine are provided in which each cylinder is, for the purposes of setting the charge air of a cylinder fresh charge, equipped at the inlet side with at least one further at least partially variable valve drive, having an inlet valve which is movable between a valve closed position and a valve open position, so as to perform a valve lift, in order to open up or shut off a valve-specific inlet opening of the cylinder during the course of a charge exchange.

Embodiments of the internal combustion engine are provided in which each cylinder is, for the purposes of setting the charge air of a cylinder fresh charge, equipped at the outlet side with at least one further at least partially variable valve drive, having an outlet valve which is movable between a valve closed position and a valve open position, so as to perform a valve lift, in order to open up or shut off a valve-specific outlet opening of the cylinder during the course of a charge exchange.

A changed charge pressure can be compensated according to the disclosure in that the cylinder fresh charge, that is to say the charge air mass remaining in the cylinders after the charge exchange, is set and metered. For this purpose, use is made of further at least partially variable valve drives, which are provided at the inlet side and/or at the outlet side.

Figure 4:
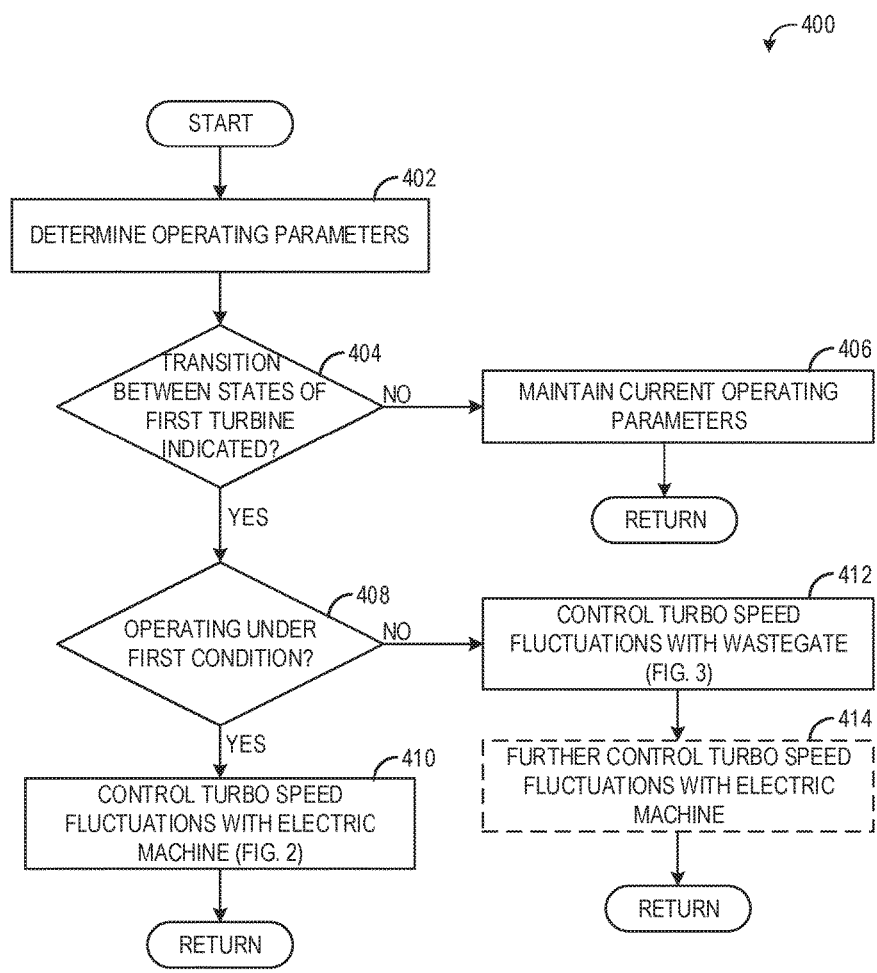
FIG. 4 is a flow chart illustrating a further method for operating the engine of FIG. 1.

FIG. 4 is a flow chart illustrating a method 400 for operating an engine, such as the engine of FIG. 1. As explained above with respect to FIGS. 2 and 3, various approaches may be available to prevent turbocharger speed fluctuations when the first (deactivatable) turbine is activated or deactivated. In engine configurations where both an electric machine and wastegate/variable valve activation hardware is present, it may be advantageous to mitigate turbocharger speed fluctuations with one approach during some conditions, while advantageous to mitigate turbocharger speed fluctuations with another approach during other conditions. Further, in some examples, it may be advantageous to utilize both approaches. Thus, method 400 selects one or both approaches depending on operating conditions.

At 402, method 400 determines operating parameters, including but not limited to engine speed, engine load, exhaust gas mass flow, turbocharger speed, valve timing, and battery state of charge. At 404, method 400 determines if a change in state of the first turbine is indicated. The change in state may include transitioning from an activated first turbine to a deactivated first turbine, or it may include transitioning from a deactivated first turbine to an activated first turbine. If no change in state is indicated, method 400 proceeds to 406 to maintain current operating parameters (e.g., current wastegate position, electric machine status) and then method 400 returns.

If a change in state of the first turbine is indicated, method 400 proceeds to 408 to determine if the engine is currently operating under a first condition. The first condition may include operating conditions where it may be undesirable to adjust a wastegate position (for example, if the first turbine is about to be activated and exhaust mass flow is relatively high, it may result in excessive speeds of the second turbine if the wastegate is closed). The first condition may additionally or alternatively include conditions where it may be desirable to operate the electric machine. For example, if battery state of charge is relatively low and the first turbine is about to be deactivated, it may be desirable to operate the electric machine as a generator. If the engine is operating under the first condition, method 400 proceeds to 410 to control turbocharger speed fluctuations using the electric machine, for example according to the method described above with respect to FIG. 2. Method 400 then returns.

If the engine is not operating under the first condition, the engine is thus operating under a second condition. The second condition may include operating conditions where it may be undesirable to operate the electric machine, such as when battery state of charge too low to operate the electric machine as an auxiliary drive, or the second condition may include other conditions. Method 400 proceeds to 412 to control turbocharger speed fluctuations using the wastegate and cylinder valve control, for example according to the method described above with respect to FIG. 3. Method 400 optionally includes further controlling turbocharger speed fluctuations with the electric machine at 414.

In some examples, during the transition from an activated first turbine to a deactivated first turbine, and hence during the transition from actuating the exhaust valves to not actuating the exhaust valves, the transient over-speed event of the second turbocharger may be prevented by proactively opening the wastegate and increasing the charge volume, and further by operating the electric machine in the generator mode. In particular, if the wastegate and charge volume adjustment is not sufficient to reduce the speed of the second turbine, the electric machine may be activated in the generator mode to further reduce the speed of the second turbine. In doing so, the speed of the second turbocharger will be reduced or maintained.

During the transition from a deactivated first turbine to an activated first turbine, and hence during the transition from not actuating the exhaust valves to actuating the exhaust valves, a transient under-speed event of the second turbocharger may be prevented by proactively closing the wastegate and decreasing the charge volume, and further by operating the electric machine in the auxiliary drive mode. In particular, if the wastegate and charge volume adjustment are not sufficient to increase the speed of the second turbine, the electric machine may be activated to further increase the speed of the second turbine. In doing so, the speed of the second turbocharger will be maintained or increased.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for charge pressure control of a supercharged internal combustion engine having at least one cylinder head with at least two cylinders, comprising:

responsive to a command to reactivate a second turbine of a second exhaust-gas turbocharger from deactivated, driving an electric machine as an auxiliary drive, the electric machine at least connectable in terms of drive to a first exhaust-gas turbocharger, to additionally output power to a first compressor of the first exhaust-gas turbocharger to increase charge pressure; and responsive to a command to deactivate the second turbine from activated, absorbing power from a first turbine of the first exhaust-gas turbocharger via the electric machine for the purposes of lowering the charge pressure, where the first compressor of the first exhaust-gas turbocharger is arranged in parallel in an intake system with a second compressor of the second exhaust gas-turbocharger, the second turbine of the second exhaust gas-turbocharger and the first turbine of the first exhaust-gas turbocharger each arranged in an exhaust-gas discharge system, where each cylinder of the at least two cylinders has a first outlet opening and a second outlet opening for discharge of exhaust gases, the first outlet opening of each cylinder of the at least two cylinders is in the form of a switchable outlet opening, each of the first and second outlet openings of each cylinder of the at least two cylinders being adjoined by a respective exhaust line for the discharge of the exhaust gases via the exhaust-gas discharge system, where the intake system supplies charge air to the at least two cylinders, where the first compressor is arranged in a first intake line of the intake system, the second compressor is arranged in a second intake line of the intake system, and the first and second intake lines merge, downstream of the first and second compressors, to form an overall intake line, where each of the respective exhaust lines of each of the first outlet openings merge, with the formation of a first exhaust manifold, to form a first overall exhaust line which is connected to the second turbine of the second exhaust-gas turbocharger, where each of the respective exhaust lines of each of the second outlet openings merge, with the formation of a second exhaust manifold, to form a second overall exhaust line which is connected to the first turbine of the first exhaust-gas turbocharger, and where each of the first outlet openings is equipped with a switchable outlet valve that when deactivated shuts off an associated first outlet opening and when activated moves between an open position and a closed position so as to realize a valve lift $\Delta h_{max}$, and in so doing opening up the associated first outlet opening during an opening duration $\Delta t_{max}$.

2. The method as claimed in claim 1, further comprising, responsive to the command to reactivate the second turbine, activating the second turbine, with the charge pressure being maintained, by virtue of the electric machine, as the auxiliary drive, outputting an amount of power to the first compressor of the first exhaust-gas turbocharger such that the charge pressure is maintained.

3. The method as claimed in claim 1, further comprising, responsive to the command to deactivate the second turbine, deactivating the second turbine, with the charge pressure being maintained, by virtue of the electric machine, as a generator, absorbing an amount of power from the first turbine of the first exhaust-gas turbocharger such that the charge pressure is maintained.

4. The method as claimed in claim 1, responsive to the command to reactivate the second turbine, activating the second turbine by virtue of the switchable outlet valves being successively activated.

5. The method as claimed in claim 4, wherein the second turbine is activated by virtue of the switchable outlet valves being activated in successive working cycles.

6. The method as claimed in claim 4, wherein the second turbine is activated by virtue of the switchable outlet valves being activated at intervals of a predefinable number of working cycles.

7. The method as claimed in claim 1, wherein when each switchable outlet valve is deactivated, a respective associated outlet opening is shut off such that no exhaust gas is supplied to the deactivated second turbine.

8. The method as claimed in claim 1, wherein when each switchable outlet valve is deactivated, each switchable outlet valve is actuated with a reduced lift $\Delta h_{low}$ where $\Delta h_{low} < \Delta h_{max}$, during opening of the associated outlet opening, such that an exhaust-gas flow rate supplied to the deactivated second turbine is reduced.

9. The method as claimed in claim 1, wherein each switchable outlet valve is adjustable with regard to valve lift $\Delta h$, wherein when each switchable outlet valve is deactivated, each switchable outlet valve is configured to be activated by virtue of an associated valve lift being progressively increased to the valve lift $\Delta h_{max}$.

10. The method as claimed in claim 1, wherein each switchable outlet valve is adjustable in a two-stage fashion with regard to valve lift $\Delta h$, wherein when each switchable outlet valve is deactivated, each switchable outlet valve is configured to be activated by virtue of an associated valve lift being increased to the valve lift $\Delta h_{max}$ in one step.

11. The method as claimed in claim 1, wherein each switchable outlet valve is adjustable in a multi-stage fashion with regard to valve lift $\Delta h$, wherein when each switchable outlet valve is deactivated, each switchable outlet valve is configured to be activated by virtue of an associated valve lift being increased to the valve lift $\Delta h_{max}$ in stages.

12. The method as claimed in claim 1, wherein when each switchable outlet valve is deactivated, each switchable outlet valve is opened, and an associated outlet opening opened up, for a shortened opening duration $\Delta t_{short}$ where $\Delta t_{short} < \Delta t_{max}$, such that an exhaust-gas flow rate supplied to the deactivated second turbine is reduced.

13. The method as claimed in claim 1, wherein when each switchable outlet valve is deactivated, each switchable outlet valve is configured to be activated by virtue of an associated opening duration being lengthened to the opening duration $\Delta t_{max}$.

14. The method as claimed in claim 1, wherein when each switchable outlet valve is deactivated, each switchable outlet valve is operated intermittently such that each respective associated outlet opening is held closed for a first predefinable number of working cycles and each switchable outlet valve is subsequently operated, and thus each respective associated outlet opening opened, for a second predefinable number of working cycles, such that an exhaust-gas flow rate supplied to the deactivated second turbine is reduced by phased deactivation of the switchable outlet valves.

15. A method, comprising:
responsive to deactivation of a first turbine of a first turbocharger, deactivating a first exhaust valve of a cylinder to flow exhaust gas from the cylinder to a second turbine of a second turbocharger, and adjusting a speed of the second turbocharger via an electric machine coupled to the second turbocharger in a generator mode; and
responsive to activation of the first turbine, activating the first exhaust valve to flow exhaust gas from the cylinder to the first turbine and the second turbine, and adjusting the speed of the second turbocharger via the electric machine in an auxiliary drive mode.

16. The method of claim 15, further comprising, prior to the deactivating of the first exhaust valve, opening a wastegate coupled across the second turbine and adjusting a second exhaust valve to increase cylinder charge volume; and
prior to activating the first exhaust valve, closing the wastegate and adjusting the second exhaust valve to decrease cylinder charge volume.

17. A method, comprising:
responsive to a command to activate a deactivated first turbine during a first condition, commanding a wastegate coupled across a second turbine to close and adjusting a parameter of a first exhaust valve fluidly coupling a cylinder to the second turbine to decrease cylinder charge volume and activating the first turbine by activating a second exhaust valve fluidly coupling the cylinder to the first turbine; and
responsive to a command to activate the deactivated first turbine during a second condition, adjusting a speed of the second turbine via an electric machine coupled to the second turbine and activating the first turbine by activating the second exhaust valve.

18. The method of claim 17, further comprising, after activating the second exhaust valve, adjusting the parameter of the first exhaust valve to increase cylinder charge volume and adjusting a position of the wastegate based on a desired boost pressure.

19. The method of claim 17, wherein the electric machine is coupled to a battery, and wherein the first condition comprises a state of charge of the battery being below a threshold and the second condition comprises the state of charge of the battery being above the threshold.

* * * * *